(12) United States Patent
Bitzer et al.

(10) Patent No.: US 7,493,203 B2
(45) Date of Patent: Feb. 17, 2009

(54) METHODS FOR REGULATING THE GEAR RATIO OF AN AUTOMATIC POWER-BRANCHED TRANSMISSION, AND AUTOMATIC POWER-BRANCHED TRANSMISSION

(75) Inventors: Franz Bitzer, Friedrichshafen (DE); Christian Lauinger, Baden-Baden (DE); Michael Reuschel, Ottersweier (DE); Martin Vornehm, Bühl (DE); André Teubert, Bühl (DE); Manfred Homm, Bühl-Neusatz (DE); Eric Müller, Kaiserslauten (DE); Reinhard Stehr, Bühl (DE); Bernhard Walter, Oberkirch (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 211 days.

(21) Appl. No.: 10/503,170

(22) PCT Filed: Jan. 27, 2003

(86) PCT No.: PCT/DE03/00203

§ 371 (c)(1),
(2), (4) Date: Apr. 25, 2005

(87) PCT Pub. No.: WO03/067127

PCT Pub. Date: Aug. 14, 2003

(65) Prior Publication Data

US 2005/0227809 A1      Oct. 13, 2005

(30) Foreign Application Priority Data

Feb. 7, 2002 (DE) ................................ 102 05 059

(51) Int. Cl.
*B60K 23/00* (2006.01)

(52) U.S. Cl. .......................... 701/51; 477/15; 477/107; 477/110

(58) Field of Classification Search .................. 701/51; 192/48.2, 48.8, 84.6; 477/39, 15, 18, 34, 477/107, 110, 115; B60K 23/00
See application file for complete search history.

(56) References Cited

U.S. PATENT DOCUMENTS 5,168,778 A * 12/1992 Todd et al. .................... 477/49

(Continued)

FOREIGN PATENT DOCUMENTS

DE         196 31 236 A1      2/1997

(Continued)

OTHER PUBLICATIONS

Hamid Vahabzadeh and Samuel M. Linzell, "Modeling, Simulation, and Control Implementation for a Split-Torque, Geared Neutral, Infinitely Variable Transmission," SAE Transactions, vol. 100, No. Section 6, Apr. 9, 1991, XP002081681, pp. 546-557.

*Primary Examiner*—Tuan C To
(74) *Attorney, Agent, or Firm*—Alfred J. Mangels

(57) ABSTRACT

A method for regulating or controlling the transmission ratio of an automatic power-branched transmission. Power is transmitted through a shaft driven by an engine, a variable speed drive, a gear transmission, a driven shaft, and at least two control clutches. The variable speed drive and the gear transmission are connected to each other in such a way that the regulating range of the variable speed drive is traversed in one direction within a first range of transmission ratios, and is traversed in the opposite direction within a second range of transmission ratios during traversing of the entire range of transmission ratios. The shifting strategies result in reduced wear of the endless belt device and allow for comfortable changing between the transmission ratio ranges.

27 Claims, 17 Drawing Sheets

U.S. PATENT DOCUMENTS

| | | | |
|---|---|---|---|
| 5,259,272 A * | 11/1993 | Yamamoto et al. | 477/45 |
| 5,643,121 A * | 7/1997 | Greenwood et al. | 475/72 |
| 5,662,547 A | 9/1997 | Moroto et al. | 477/48 |
| 5,690,576 A * | 11/1997 | Moroto et al. | 475/211 |
| 5,754,968 A | 5/1998 | Hedström | 701/66 |
| 5,935,039 A | 8/1999 | Sakai et al. | 476/10 |
| 5,967,918 A * | 10/1999 | Knapp et al. | 474/28 |
| 6,030,311 A | 2/2000 | Osumi | 476/42 |
| 6,063,002 A | 5/2000 | Nobumoto et al. | 477/41 |
| 6,210,298 B1 * | 4/2001 | Baur et al. | 475/211 |
| 6,351,700 B1 | 2/2002 | Muramoto et al. | 701/51 |
| 6,358,179 B1 | 3/2002 | Sakai et al. | 475/216 |
| 6,475,112 B2 * | 11/2002 | Loffler et al. | 477/45 |
| 6,561,942 B2 * | 5/2003 | Wehking | 475/216 |
| 6,597,977 B1 * | 7/2003 | Danz et al. | 701/51 |
| 6,623,388 B1 * | 9/2003 | Senger et al. | 474/69 |
| 6,631,319 B1 * | 10/2003 | Luh | 701/54 |
| 6,672,990 B2 * | 1/2004 | Netzer | 477/156 |
| 2001/0041640 A1 | 11/2001 | Sakai et al. | 475/207 |
| 2002/0094904 A1 * | 7/2002 | Kuramoto et al. | 475/207 |

FOREIGN PATENT DOCUMENTS

| | | |
|---|---|---|
| DE | 196 31 294 A1 | 2/1997 |
| EP | 0 899 484 A1 | 3/1999 |
| EP | 1 065 412 A2 | 1/2001 |
| FR | 2800826 A1 * | 5/2001 |
| JP | 04307159 A * | 10/1992 |
| JP | 10267116 A | 10/1998 |
| JP | 2001021027 A | 1/2001 |
| WO | WO 02/095267 | 11/2002 |

* cited by examiner

METHODS FOR REGULATING THE GEAR RATIO OF AN AUTOMATIC POWER-BRANCHED TRANSMISSION, AND AUTOMATIC POWER-BRANCHED TRANSMISSION

BACKGROUND OF THE INVENTION

1. Field of the Invention

The invention concerns a method for regulating the transmission ratio of a power-branched automatic transmission. The invention furthermore concerns a power-branched automatic transmission for carrying out the method of the invention.

2. Description of the Related Art

Transmissions with a continuously variable transmission ratio (CVT transmissions) are being increasingly installed in passenger cars because of their higher comfort and the reduced fuel consumption that is possible relative to automatic transmissions operating in steps and exclusively with planetary gear sets. Power transfer takes place in CVT transmissions for example through an endless torque-transmitting means that circulates between two pairs of conical disks, whereby the effective radius of each conical disk pair is variable by changing the spacing between the disks. Other steplessly adjustable transmissions are based upon rolling elements that run frictionally engaged between suitable toroidal surfaces or other principles. CVT transmissions with the greatest possible spread (ratio of the maximum transmission ratio to the minimum transmission ratio) are advantageous. At this time, values of up to >6 are being achieved. A constant contact pressure between the two bodies situated in frictional engagement with each other is necessary to produce a frictionally tight structure. With belt-driven conical pulley transmissions, a contact pressure dependent upon the torque transferred at that moment is generally produced by contact pistons. That torque contact pressure is superimposed by an adjustment contact pressure, by means of which the transmission ratio adjustment takes place. An adjustable difference of the contact pressure acting on the pairs of conical disks is needed for adjusting the transmission ratio.

For reasons of reduced fuel consumption, it is desirable to enlarge the spread of a transmission above the value that is possible with a single CVT transmission. That is accomplished with power-branched transmissions in which the spread or the transmission ratio range of the CVT transmission utilized is "doubled" in that by a combination with a gear transmission, and activation of corresponding control clutches, the transmission ratio range of the CVT transmission is run through twice in the opposite direction when changing the overall transmission ratio of the power-branched transmission over its entire spread range.

FIG. 1 shows a basic structure of a motor vehicle power train with a power-branched transmission.

A drive engine of a motor vehicle, for example, an internal combustion engine 2, is connected through a starting clutch 4 with an input shaft 6 of a power-branched transmission 8, whose output shaft is designated by 10.

The power-branched transmission 8 contains a variator 12, or variable speed drive, in the form of a continuously variable transmission, and at least one gear transmission 14 as well as at least two control clutches K1 and K2, with which the variator 12 can be coupled in various ways with the gear transmission 14. Inputs of an electronic control or regulating apparatus 16 are connected with an accelerator pedal sensor 18, a power actuator position sensor 20 of the internal combustion engine 2, an engine rotational speed sensor 22, a sensor 24 for an input shaft of the variator 12 that can be the input shaft 6 at the same time, a sensor 26 for detecting the rotational speed of the output shaft of the variator 12, a sensor 28 for detecting the rotational speed of the output shaft 10 as well as if necessary further sensors. Output signals are generated in the electronic control or regulating apparatus as a function of the signals of the sensors and algorithms, characteristic fields, etc. stored in the control apparatus 16, with which are controlled a power actuator 30 of the internal combustion engine 2, an actuator for the starting clutch 4, the torque-dependent pressure in the contact pressure cylinders for the conical disk pairs of the variator 12, the pressure in the adjusting cylinders of the conical disk pairs of variator 12 for altering its transmission ratio, and the control clutches K1 and K2. Not shown are gear sets or a clutch and/or a brake for reverse travel.

The structure and function of the individual components described are known and will therefore not be explained in detail.

FIG. 2 shows an example of a power-branched transmission with a variator 12, whose one conical disk pair 30 is non-rotatably connected with the input shaft 6 and can be coupled with a first gear 32 through a first control clutch K1.

The other conical disk pair 34 of the variator 12 is non-rotatably connected with an output shaft 36, which, in turn, is non-rotatably connected with the sun gear 37 of a gear transmission 14 in the form of a planetary transmission. The output shaft 36 can further be coupled through a control clutch K2 with a second gear 38 that is in rotary engagement with the first gear 32 through an idler gear 40. The second gear 38 is non-rotatably connected with the planet carrier 42 of the planetary transmission, whose planet gears 44 mesh with the ring gear 46 that is non-rotatably connected with the output shaft 10. When control clutch K2 is engaged and control clutch K1 is disengaged, the sun gear 37 and the planet carrier 42 rotate together so that the planet gears 44 stand still and drive the ring gear 46. The entire power-branched transmission then operates like a simple CVT transmission whose overall ratio is utilized doubled in accordance with FIG. 3. In FIG. 3, the abscissa represents the transmission ratio $i_{var}$ of the variator and the ordinate the transmission ratio $i_{ges}$ of the entire power-branched transmission.

Proceeding from the greatest possible transmission ratio (starting transmission ratio; from the upper right in FIG. 3), the overall transmission ratio declines linearly along the low branch with increasing transmission ratio of the variator until the shift point U is reached, at which the transmission ratio $i_{var}$ has a low, predetermined value. The control clutches K1 and K2 are shifted at the shift point U so that the planet carrier 42 henceforth rotates with the given transmission ratio in accordance with the transmission ratio between the first gear 32 non-rotatably connected with the input shaft 6, the idler gear 40 and the second gear 38 in accordance with the input shaft 6, and the planetary transmission 14 becomes operative. The transmission ratios are selected in such a way that the overall ratio $i_{ges}$ of the power-branched transmission is independent of the shift condition of the control clutches K1 and K2 at the shift point U. If the spread range of the variator 12 is traversed again, then the transmission ratio $i_{ges}$ changes along the high branch (high speed region) represented in FIG. 3. The R branch reproduces the transmission ratio conditions for the reverse travel region. It is apparent that other curve gradients are also possible as a function of the construction of the power-branched transmission.

FIG. 4 shows another example of a power-branched transmission, in which the transmission ratios are as shown in FIG. 5, according to the actuation position of the control clutches K1 and K2. Such transmissions are designated as "geared neutral" transmissions since with the transmission ratio $i_{var}=G$ of the variator, theoretically a positively or negatively infinite transmission ratio results when the transmission is situated in the low branch condition.

FIGS. 6 and 7 show a further example of a power-branched transmission in which, in accordance with FIG. 6, the variator transfers torque from the lower disk set to the upper disk set when the control clutches K1 and K1' are engaged and the control clutches K2 and K2' are disengaged, whereas it transfers torque downward from above when control clutches K1 and K1' are disengaged and control clutches K2 and K2' are engaged. The torque transmission direction consequently reverses itself at the shift point. That results in the transmission ratio conditions in accordance with FIG. 7.

FIG. 8 shows the basic structure of a further power-branched automatic transmission with a variator 12 and two planetary transmissions 14 and 14'.

The overall transmission ratio $i_{ges}$ of the transmission in accordance with FIG. 8 as a function of the transmission ratio $i_{var}$ of the variator is represented in FIG. 9.

With CVT transmissions, a common method for establishing the transmission ratio consists in carrying out a rotational speed regulation that sets a target engine rotational speed while the transmission ratio of the transmission is changed in such a way that the target engine rotational speed is set. The target engine rotational speed is determined by evaluating a characteristic curve as a function of the actuation of an accelerator pedal. In any case, an actuation control system, whether as a transmission ratio regulator or as a rotational speed regulator, is necessary because of the behavior of a CVT transmission.

An obvious strategy for carrying out a range change at the shift points U, thus the predetermined shift transmission ratios, results from the transmission ratio diagrams of FIGS. 3, 5, 7, 9 in connection with power-branched transmissions. Adjustment thereby takes place in a transmission ratio range up to the shift transmission ratio, it is then shifted, and the transmission ratio is subsequently further adjusted in the new transmission ratio range. The adjustment of the variator thereby changes its direction, so that an actuation of the variator must also take place in association with the shift of the control clutches K1 and K2 (which can also be realized as brakes).

Various problems arise from the combination of several individual actuations (clutches and/or brakes, adjustment regulators) that act upon the same power train. The operation of a first actuation influences the necessity of another actuation or its operation over the power train. The following can be identified as problems for the present power-branched automatic transmission with a variator: power train oscillations that arise during shifting, or excessive wear of the frictionally-engaged elements in the variator or the endless torque-transmitting means.

The invention is based upon the object of producing a method for regulating the transmission ratio of a power-branched automatic transmission with a variator and at least one gear transmission, which makes possible comfortable shifting and does not wear the frictionally-engaged elements in the variator. The invention furthermore is based on the object of producing a power-branched automatic transmission for carrying out the method of the invention.

Accomplishing the object of the invention regarding the method is achieved with the methods described hereinafter.

SUMMARY OF THE INVENTION

The invention is applicable for all types of power-branched transmissions with a variator, especially a belt-driven conical-pulley transmission. The invention is especially applicable for use in power-branched transmissions installed in motor vehicles.

Briefly stated, in accordance with one aspect of the present invention, a method for regulating the transmission ratio of a power-branched automatic transmission is provided. The transmission includes an input shaft driven by a engine, a variator with a continuously variable transmission ratio, a gear transmission, an output shaft, and at least two control clutches. The variator and the gear transmissions are connected with one another through the control clutches in such a way that when traversing the overall transmission ratio range of the power-branched transmission, within a first ratio range the adjustment range of the variator is traversed in one direction, and within a second transmission ratio range in the opposite direction. At least one regulator parameter of an adjustment regulator utilized to set the transmission ratio of the variator changes its sign during the transition between the transmission ratio ranges.

BRIEF DESCRIPTION OF THE DRAWINGS

The invention will be explained below by way of example and with further details on the basis of schematic drawings in which.

DESCRIPTION OF THE PREFERRED EMBODIMENTS

Figure 1:
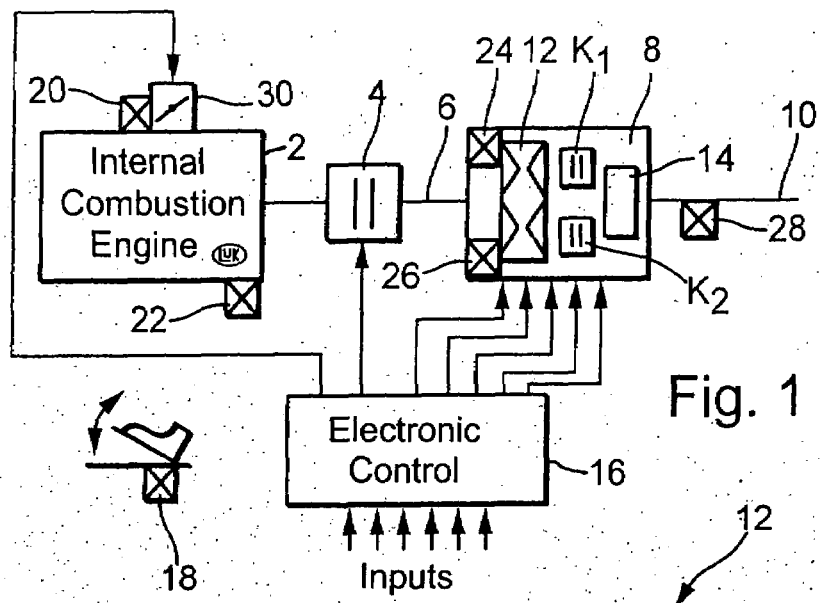
FIG. 1 shows a block diagram of a motor vehicle power train with a power-branched CVT transmission.
Figure 10:
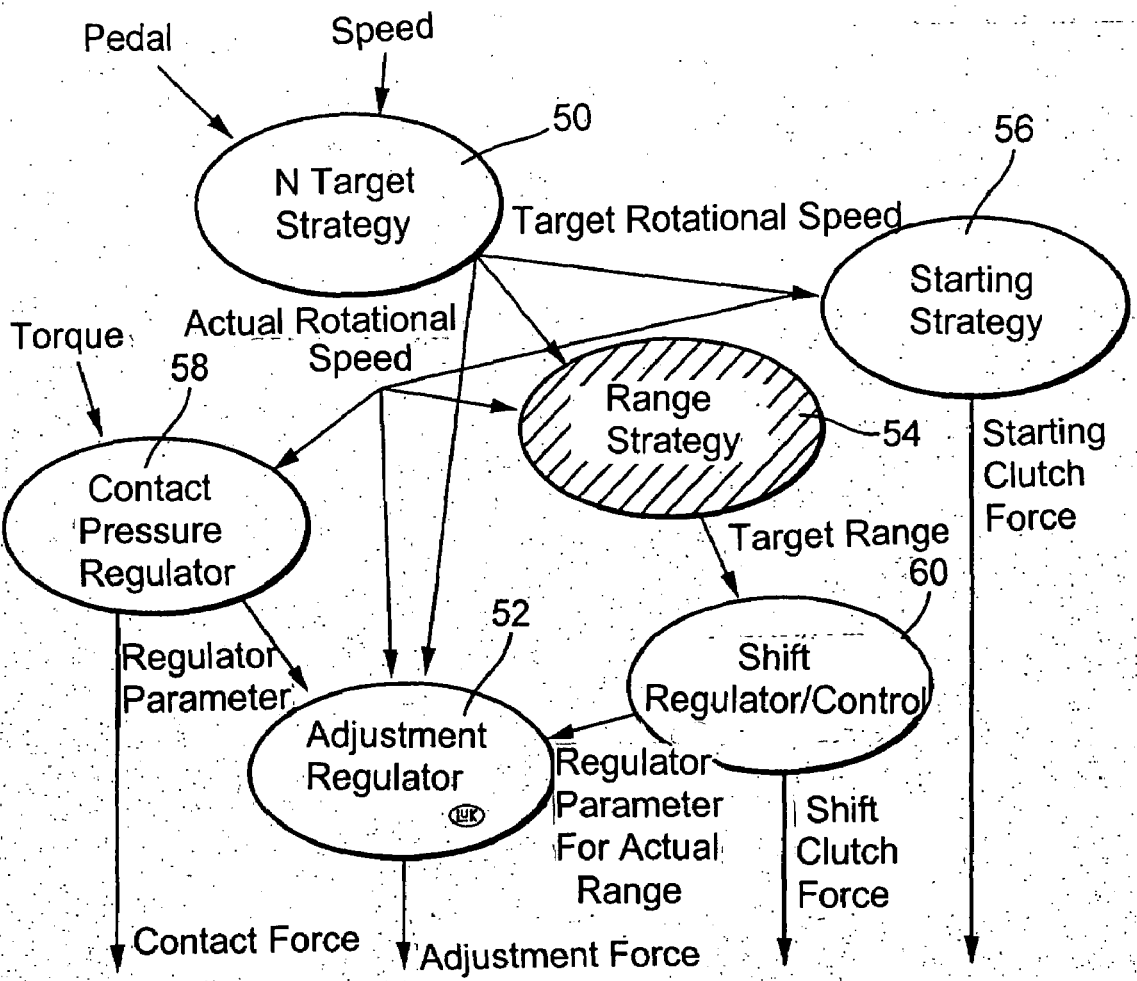
FIG. 10 shows functional blocks of a control or regulating device for a power-branched CVT transmission.

FIG. 10 shows the basic arrangement of control and regulation modules as they can be implemented by way of hardware and/or software in the electronic control or regulation unit 16 in accordance with FIG. 1. The individual ovals represent functional blocks or modules.

An $n_{target}$-strategy-module 50 establishes a target rotational speed $n_{target}$ of the engine or the input shaft 6 as a function of the position of the accelerator pedal 18 and the motor vehicle speed. That target rotational speed $n_{target}$ is supplied to an adjustment regulator 52, a range strategy module 54 and a starting strategy module 56. The range strategy module 54, the adjustment regulator 52, the starting strategy module 56 as well as a contact pressure regulator 58 are in addition supplied the actual rotational speed of the engine or the input shaft 6. Thereby not all connections are essential, for example, the consideration of the actual rotational speed in the starting strategy module. Additional connections can also be provided. The contact pressure regulator 58, to which additionally the torque produced by the engine 2 is supplied, regulates the contact pressure of the conical disks of the CVT transmission (the variator), which is dependent upon the torque and additionally the rotational speed of the input shaft 6, in such a way that no undesired slippage arises between the conical disks and the endless torque-transmitting means.

The range strategy module 54 establishes, as a function of the desired target rotational speed and the actual rotational speed, the transmission ratio range (low branch or high branch) of the power-branched transmission and supplies a corresponding signal to a shift module 60, which correspondingly controls the control clutches. Inputs of the adjustment regulator 52 are supplied a parameter of the contact pressure regulator 58 and the shift module 60, so that, as a function of its input signals, the adjustment regulator 52 regulates the forces acting on the adjusting cylinders of the conical disk pairs in such a way that the actual rotational speed approaches the target rotational speed. The starting strategy module 56 controls or regulates the operation of the starting clutch 4 (FIG. 1) as a function of the target rotational speed or speeds when starting up.

The $n_{target}$ strategy module 50 determines the current power requirement in a known manner from, for example, the operation of the accelerator pedal 18 and the current motor vehicle speed. An acceleration demand of the driver that is input through the accelerator pedal is transformed into a target rotational speed in such a way that the power calculated from the target rotational speed and engine torque corresponds to the power requirement. At the same time, the engine is operated in a known manner at a rotational speed for the most favorable fuel consumption possible. Strategies of that type and their advantages are known from conventional CVT transmissions. An equivalent strategy consists in deriving a target transmission ratio directly from the target rotational speed.

The adjustment regulator 52 is responsible for adapting the rotational speed of the input shaft 6, which at the same time forms the transmission input shaft, to the target rotational speed in that the forces on the disk sets and therewith the transmission ratio of the variator and, as a function of the activated transmission ratio range, the transmission ratio of the overall transmission is therewith changed. The adaptation can take place using an underlying gradient regulator that adjusts a rotational speed alteration rate. In that case, the adjustment regulator 52 also contains corresponding differential elements. The adjustment regulator 52 is advantageously supplemented by anticipatory controls that pass through directly to the regulator output to assist. Such anticipatory controls can serve, for example, to directly produce the necessary forces from the support path. In order to take into consideration the non-constant reaction of a real variator on a force change, additional "decoupling factors" can be utilized. In that way, the fact that the variator reacts more or less responsively depending on the transmission ratio can be allowed for.

Figure 3:
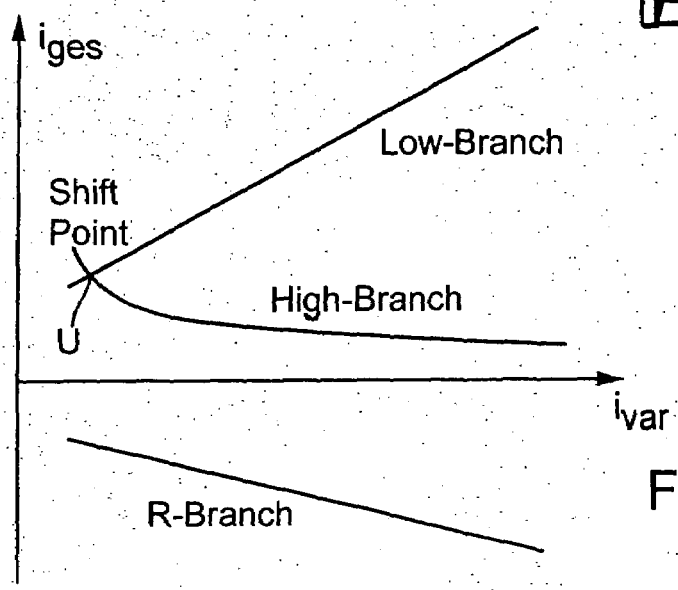
FIG. 3 shows a transmission ratio diagram of the CVT transmission in accordance with FIG. 2, FIG. 4 to FIG. 9 show examples of further power-branched CVT transmissions with associated transmission ratio diagrams.
Figure 4:
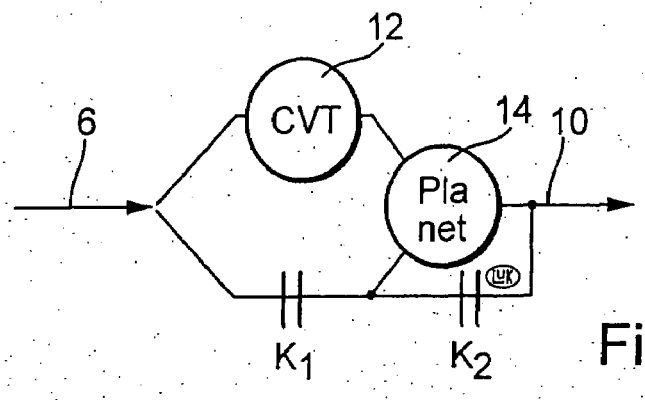
Figure 11:
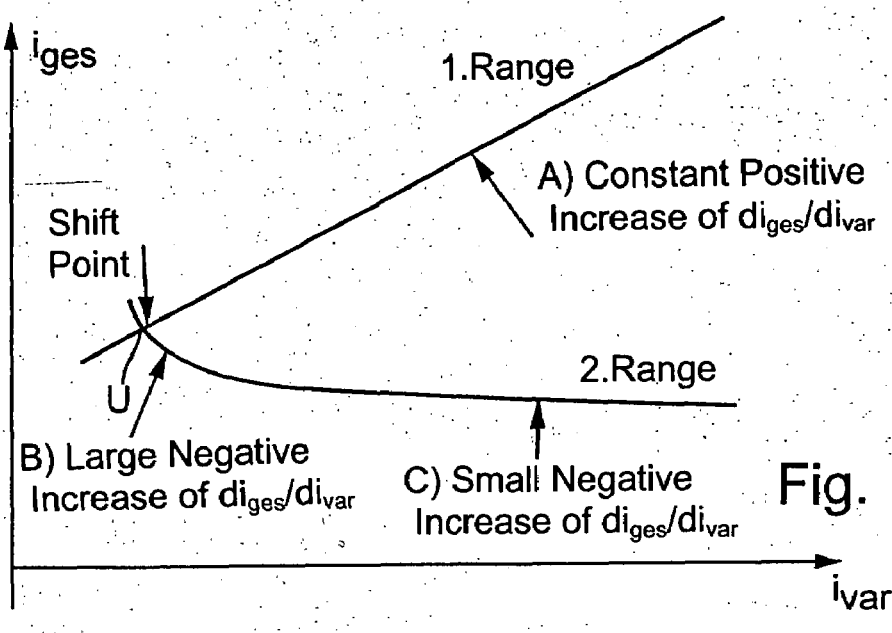
FIG. 11 shows a transmission ratio diagram for explanation of a shifting strategy.

The following problems, among others, arise when using a conventional variator in a power-branched transmission:

Problem 1:

If the overall transmission ratio $i_{ges}$ of the power-branched transmission is to be reduced starting from the high starting transmission ratio, the transmission ratio $i_{var}$ of the variator must be reduced in the first range in accordance with FIG. 11 (which corresponds to FIG. 3), and then increased in the second range. A conventional adjustment regulator 52 can consequently not cover both ranges; it would do exactly the opposite of what is required in one range.

In accordance with the invention a first solution to that problem in accordance with the invention consists in that at least one regulator parameter of the adjustment regulator 52 changes its sign when shifting between the two transmission ratio ranges. The respectively effective sign is communicated to the adjustment regulator 52 by the shift module 60.

As a function of the complexity of the regulator, the regulator parameter with a changed sign can be a controlling parameter processed within the regulator that changes the output signal of the regulator. In a simple embodiment, a regulator parameter, if need be the output signal itself, is changed in such a way when shifting that the sign of the output signal changes when shifting.

A further development of the above-mentioned solution consists in that not only the sign of the output signal of the adjustment regulator 52 is changed as a function of the transmission ratio range, but that the output signal is additionally changed in accordance with the momentary value of $di_{ges}/di_{var}$, for example multiplied by that gradient. The gradient or the slope of the branches of the transmission ratio curves indicates how strongly and in which direction the variator is acting on the overall transmission. If a specified change of the overall transmission ratio is desired, it is necessary to adjust the variator only little (B) or especially strongly (C). Through the gradients (or their reciprocal value) a measure for a factor is provided, with which the output of the adjustment regulator 52 is appropriately multiplied.

A further solution of the problem is advantageously achieved by multiplying the P component of the regulator with the momentary value of $di_{ges}/di_{var}$ when the adjustment regulator is a PID controller.

Alternatively, the problem of operating two different adjustment directions with a single adjustment regulator can be solved in such a way that an input signal of the adjustment regulator in accordance with the deviation between the target rotational speed and the actual rotational speed is changed in accordance with the momentary value of $di_{ges}/di_{var}$, for example multiplied by it.

It is apparent that with complicated regulator structures, it can be selectively decided which regulator building blocks are shifted when shifting the transmission ratio range.

Figure 12:
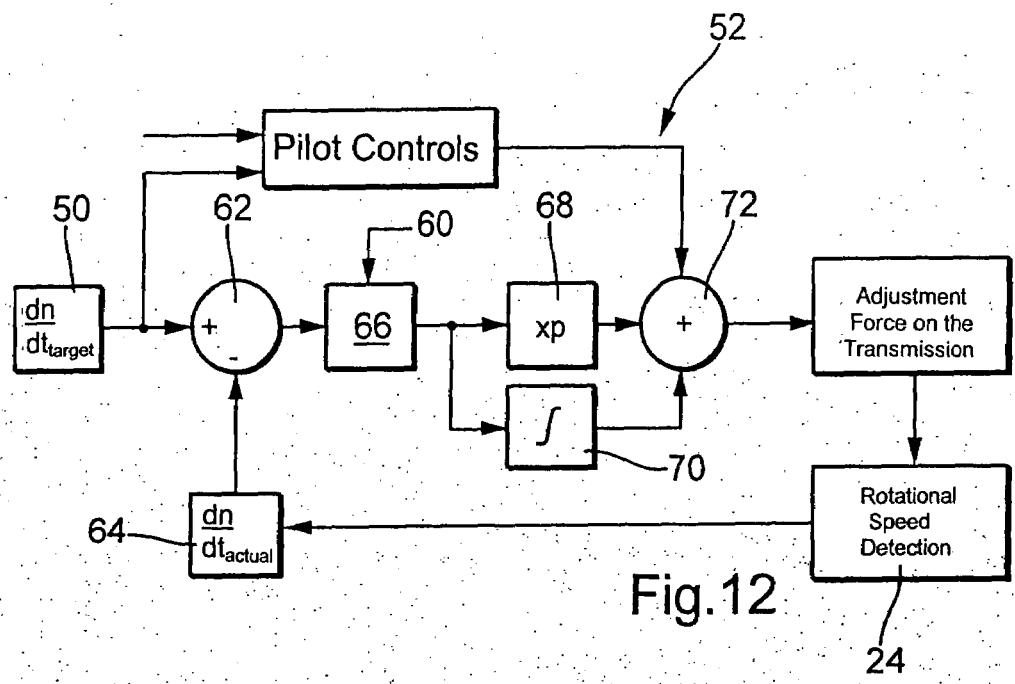
FIG. 12 shows a block diagram for explanation of the variator adjustment.

FIG. 12 shows the design of an adjustment regulator 52 (FIG. 10) as it can be utilized for the above-mentioned problem solutions.

Figure 2:
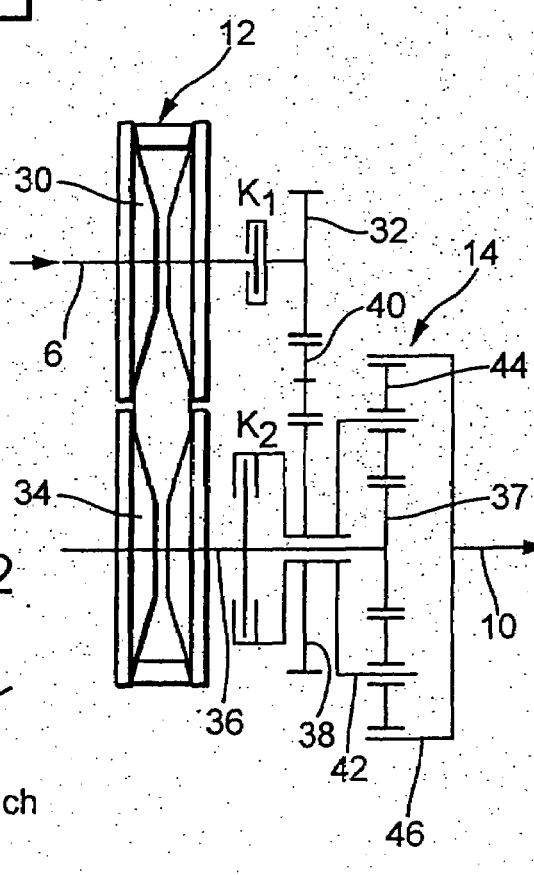
FIG. 2 shows a section through an embodiment of a power-branched CVT transmission.

A target rotational speed change $dn/dt_{target}$ is supplied by the target rotational speed strategy module 50 to a control element 62, whose other input is supplied with an actual rotational speed change $dn/dt_{actual}$ produced by a differential element 64, which is produced from a signal derived from a rotational speed sensor 24 (FIG. 2). The output signal in accordance with the difference between the input signals of the control element 62 is supplied to a shift element 66, which is supplied a signal from the shift module 60 that influences the output signal of the control element 62 according to the activated range, for example reverses its polarity. The output signal of the shift element 60 is supplied to a proportional element 68 and an integrating element 70, whose output signals, in turn, are additively processed in the control element 72 together with pilot control signals, for example relative to torque, rotational speed, variator transmission ratio, change over time of the target rotational speed, and the like. The output signal of the control element 72 determines the adjusting force supplied to the variator.

Figure 5:
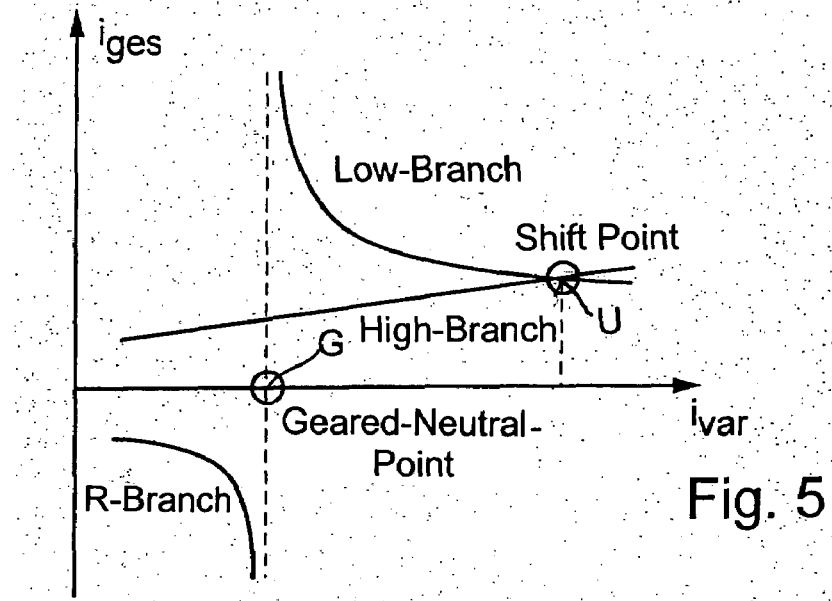

The shift element 66 can advantageously also be utilized within a transmission ratio branch (see FIG. 3 high branch or, for example, FIG. 5 low branch) for its adaptation to a special ratio between overall transmission ratio and the variator transmission ratio. For example, the high branch can be adapted in such a way that a linear characteristic curve arises from it.

It is possible to act upon the integrating element 70 when carrying out the range shift through an adjustment impulse (not shown). Thereby the output signal of the integrating element 70 is influenced once, which brings about a progression of a given magnitude in the adjusting force operating in the variator. That adjusting impulse is constantly so directed that it brings about an adjustment of the variator away from the variator shift transmission ratio, thus operates like a "reflection of the path displaceable disk displacement in the shift." The magnitude of the adjusting impulse depends upon how fast adjustment of the shift transmission ratio takes place, thus how large $dn/dt_{target}$ is.

Figure 13:
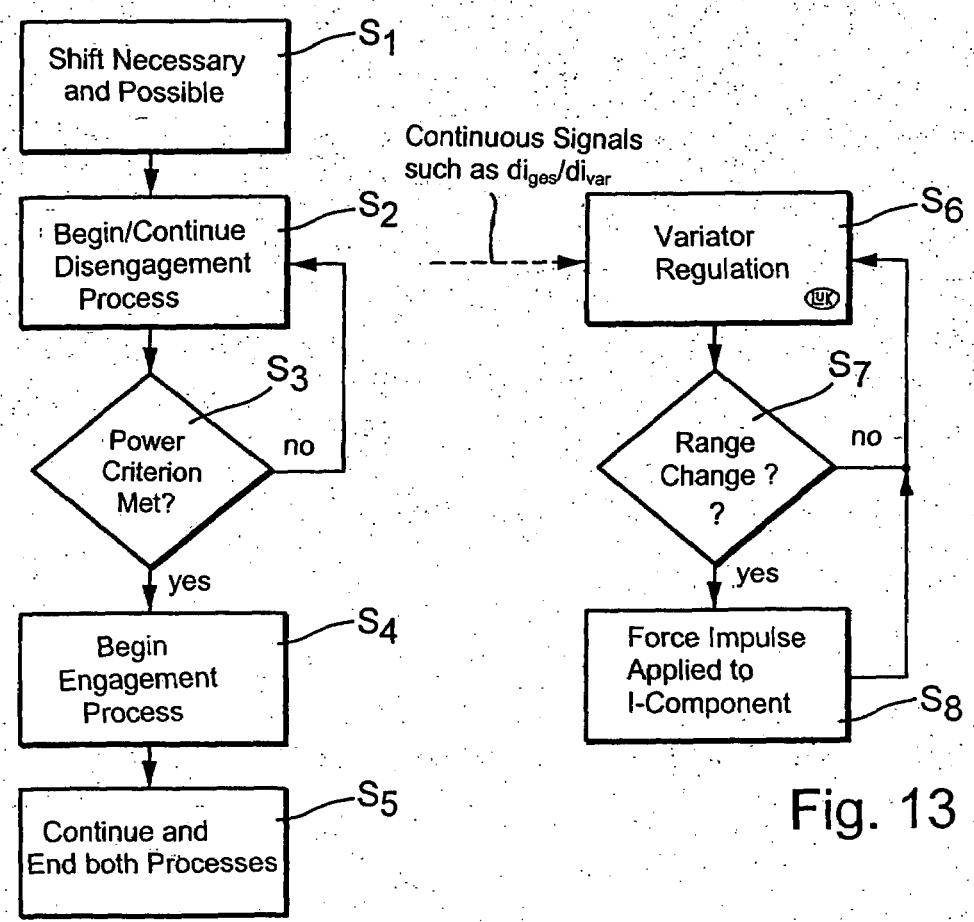
FIG. 13 shows flow diagrams for explanation of a range shift.

In FIG. 13, the left part shows a flow chart of a shift as it progresses in the shift element 60 (FIG. 10). The right part of FIG. 13 shows a shift relative to the part concerning the adjustment regulator 52.

In step S1, the range strategy module 54 (FIG. 10) checks whether a range change is necessary and possible. If that is the case, then a control signal to disengage a first control clutch is produced in step S2. As will be explained further below, it is appropriate to delay the engagement process of a second control clutch in the event of a retarding down-shift or a power up-shift if one power criterion is not met. In step S3 it is therefore checked whether the power criterion has been met. If that is not the case, the first clutch remains disengaged. If that is the case, then the other clutch is engaged in step S4. In step S5, the disengagement of the first clutch and the engagement of the second clutch is completely carried out, and the shift is completed.

The application of an impulse to the integrating element 70 (FIG. 12) is shown in the right part of FIG. 13. The adjustment regulator 52 (FIG. 12) can be utilized in both transmission ratio ranges (branched and unbranched operation) if its input continually recognizes the current range, for example by means of the signal $di_{ges}/di_{var}$. In step S6 the normal adjustment regulation or variator regulation shown on the basis of FIG. 12 takes place. If it is established in step S7 that a range change is taking place, then an impulse is applied to the integrating element 70 in step S8, which leads to the described step change of the adjustment force on the transmission.

Problem 2:

When traversing the overall transmission ratio $i_{ges}$, the transmission ratio of the variator $i_{var}$ must be regulated close to the shift point U and subsequently be regulated away from the shift point U. If that reversal is not carried out exactly, the motor vehicle jerks uncomfortably. That jerk also means increasing wear of the endless torque-transmitting means of the variator or the frictionally-engaged elementss included in it.

A first solution of the above-mentioned problem consists in that the regulator input signals are reduced during the shift of control clutches K1 and K2 in that they are multiplied during the shift, for example, by a factor that is <1 or is even numerically shifted to zero. In that way, the effective target-actual deviation communicated to the adjustment regulator 52 is reduced during the shift. Therewith, the result is that the potentially disturbing signals that influence the adjustment regulator 52 during the shift of control clutches K1 and Kr are harmless.

In accordance with a further solution to the above-mentioned problem, an anticipatory control of the different contact pressures of the disk pairs of the variator, which are respectively a function of the transmitted torque, is not shifted during the transition between shift ranges. That anticipatory control, which is a function of the current torque on the variator, is nonetheless adapted to the new range.

A further solution to the above-mentioned problem, that can be adopted as an alternative or in addition to the above-mentioned measures, consists in that I-parts present in the adjustment regulator 52 are changed, especially reduced, or in particular are advantageously suddenly set to zero when shifting between shift ranges. A further arrangement of the method for solving the above-mentioned problem 2 consists in allowing to continue to exist that portion of the I-part that caused the starting of the shift point U with a speed $di_{var}/dt$. That is the entire I-part in the ideal case of a perfect anticipatory control, which can then continue to exist as an I-part following a multiplication in accordance with the solution of problem 1 and can contribute to adjusting the variator.

Figure 14:
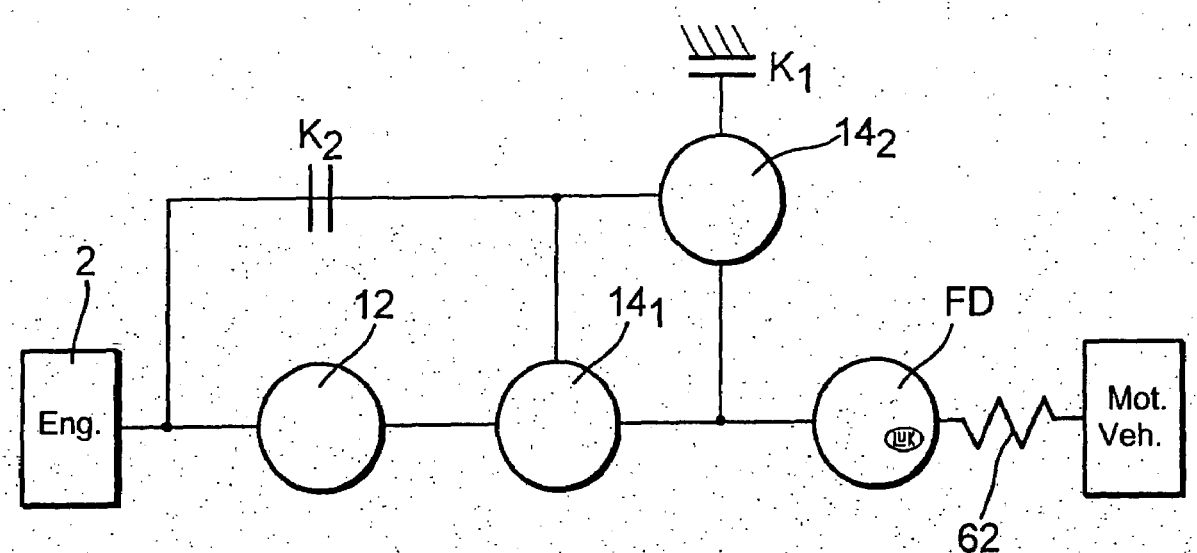
FIG. 14 shows a basic representation of a further embodiment of a power-branched CVT transmission.

Problem 3:

An advantageous solution to the general problem of shifting between ranges will be shown below:

FIG. 14 shows a further example of a power-branched transmission with a variator 12, a first planetary transmission $14_1$, a second planetary transmission $14_2$, and a transmission ratio step FD connected downstream in series whose torsionally-flexible connection with the additional elements of the motor vehicle is symbolized by 62.

In an advantageous way a starting clutch (not shown) is provided between the engine 2 and the transmission. A clutch for reverse travel is not shown.

The connection of the planetary transmissions $14_1$ and $14_2$ can be the following, for example:

The sun gear of $14_1$ is rigidly connected with the output shaft of the variator 12; the planet carrier of $14_1$ is rigidly connected with the ring gear of $14_2$, which is rigidly connected with the output of the control clutch K2; the ring gear of $14_1$ is rigidly connected with the planet carrier of $14_2$, which is rigidly connected with the input of the transmission ratio step FD; the sun gear of $14_2$ is rigidly connected with the control clutch K1.

If K1 is engaged and K2 is disengaged, power transmission takes place only through the variator. If $i_{P1}$, $i_{P2}$ and $i_{FD}$ are transmission ratios of $14_1$ and $14_2$ and the transmission ratio step FD, there results for the overall transmission ratio (the transmission ratios of possibly provided reduction gears or idler gears are not taken into consideration):

$$i_{ges} = i_{FD} \times i_{var} \times (i_{P1} + i_{P2} - 1)/i_{P2}.$$

If K1 is disengaged and K2 is engaged, a branched power flow takes place through K2 and the variator. The overall transmission ratio is calculated as:

$$i_{ges} = i_{FD} \times i_{P1}/(1/i_{var} + i_{P1} - 1).$$

Figure 15:
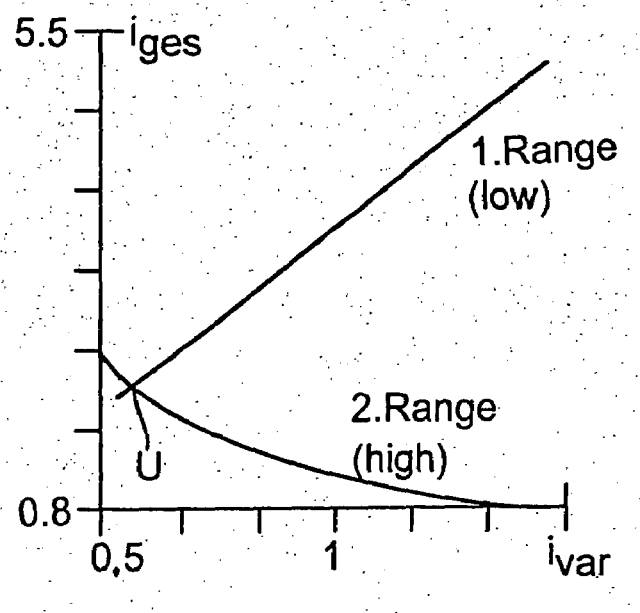
FIG. 15 shows a transmission ratio diagram of the transmission in accordance with FIG. 12.

If $i_{p1} = -2.5$ and $i_{p2} = -2$, the transmission ratio diagram in accordance with FIG. 15 results, whereby $i_{ges}$ does not contain the ratio $i_{FD}$ of transmission ratio step $14_3$.

Advantageous strategies for a range shift according to which range strategy module 54 operates will be described below:

The range strategy contains the following steps:

Calculation of the actual transmission ratio $i_{var}$ of the variator and of the overall transmission ratio $i_{ges}$ of the transmission from measured rotational speeds and the currently activated operating range.

Calculation of the vibration-decoupled actual rotational speed $n_{actual}$ at the input of the transmission from the overall transmission ratio $i_{ges}$ and a value in accordance with the motor vehicle speed, for example the measured rotational speed of a wheel.

Calculation of the change in the actual rotational speed $dn_{actual}/dt$, which is determined from the existing transmission input rotational speed and the changeover time since the last evaluation, for example by extrapolation with the aid of the derivation over time. Furthermore a change in the target rotational speed $dn_{target}$ is determined in that the motor vehicle speed $v_{actual}$ and the transmission input rotational speed $n_{actual}$ are determined, a target rotational speed $n_{actual}$ is calculated on the basis of $v_{actual}$ and an accelerator-pedal-dependent target transmission ratio, and $dn/dt_{target} = f(n_{target} - n_{actual})$ is determined, so that small deviations $n_{target} - n_{actual}$ with a slow $dn/dt_{target}$ and greater deviation are controlled with a higher $dn/dt_{actual}$.

Calculation of the shift rotational speed $n_{Um}$ at which the range shift U should take place exactly at the current speed, and decision on a possibly applied range change on the basis of the above-mentioned calculated values.

On the steps in detail:
On 1.

In power-branched transmissions, the overall transmission ratio and the variator transmission ratio are variously related according to the transmission ratio range. An obvious calculation of the overall transmission ratio would consist in measuring the transmission input and output rotational speeds and dividing them by each other. Subsequently, the variator transmission ratio could be calculated on the basis of the above-mentioned transmission ratio formulas.

The reverse way is likewise possible and is preferred, namely measuring the rotational speeds directly on the input and output shaft of the variator and calculating $i_{var}$. From that, calculating $i_{ges}$ in accordance with the above-mentioned formulas. In accordance with the choice of method, it is established where rotational speed sensors are to be installed: With the first-mentioned method at the transmission input and at the transmission output, with the second-mentioned method at the transmission input and at the output of the variator. In addition, with both methods, the wheel rotational speed or a value in accordance with the motor vehicle speed is to be determined.

The first-mentioned variant has the disadvantage that the transmission ratio of the variator cannot be determined if one of the clutches or brakes slips. Special regulatory/control algorithms are hence not feasible without additional sensors as, for example, a regulation explained further below in the neutral condition.

On 2.

The oscillation decoupling is possible analogously to typical CVT transmissions.

On 3.

The subsequent consideration of the change of target and actual rotational speeds is important.

On 4.

The transmission ratio at the shift point is rigidly set by the structure of the transmission.

On 5.

The range strategy can be represented in the form of an automated status mechanism as is explained below on the basis of FIG. 16.

In the low condition shown in the left circle the opening of a power path parallel to the variator 12 (in the example of FIG. 14 disengagement of K2) and closing of another power path (engagement of clutch K1) is brought about. In the high condition shown in the right circle the power path parallel to the variator is closed and opens another power path.

In the neutral condition shown in the center circle the power path parallel to the variator as well as a further power path are opened so that the transmission has no frictional connection.

The shift from the low range 1 into the high range 2 advantageously takes place when the following conditions are present:

Idle period (duration since a preceding range shift) expired AND $$n_{target} + a \times dn_{target} < n_{Um} \text{ (shift rotational speed AND)}$$

$$n_{actual} + b \times dn_{actual} - c < n_{Um} \text{ (a, b and c are constants)}$$

A shift not at the exact shift point U, but already shortly before has a comfort-increasing effect. The shift takes place in that way with a low transmission ratio and a rotational speed jump that can be comfortably arranged by a suitable operation of the clutches. The shift before the actual shift point is achieved by the term c being present in the above-mentioned conditions. Through the term $b \times dn_{actual}$, the shift additionally takes place somewhat earlier, to take dead times of the actuation system into consideration.

The strategy of demanding the gear change before the actual shift transmission ratio leads to a "negative" hysteresis between both transmission ratio ranges. That means that immediately following a change from 1 to 2, the conditions for a change back from 2 to 1 are met. In order to avoid possible resulting shift oscillations, a timewise hysteresis with an idle period is implemented in the condition machine.

The shift from high region 2 into the low region 1 takes place when the following conditions exist:

Idle period expired AND $$n_{target} + a \times dn_{target} > n_{Um} \text{ AND}$$

$$n_{actual} + b \times dn_{actual} + c > n_{Um}.$$

The zero condition serves to facilitate the adjustment of the variator into the starting transmission ratio in a standstill or, for example, during braking with ABS engagement or quite generally with blocked wheels. The adjustment of the CVT transmission or the variator is all the more difficult the slower the conical disks rotate. With or after blockage-like braking that adjustment is rendered more difficult for that reason. Disengaging the transmission during braking consequently not only has the advantage of facilitating ABS regulation, but also facilitates the adjustment toward the starting transmission ratio UD. That advantage can even have the effect that the construction of the variator can manage with smaller contact pressure cylinders, which leads to cost and weight savings.

Shifting from the high range 2 to the neutral range 0 advantageously takes place when the following conditions exist:

$$\text{ABS braking AND } n_{target} >> n_{Um} >> n_{actual}$$

The condition for activating neutral rapid adjustment following UD means that a blockage braking exists that requires a transmission ratio adjustment beyond the range change that was not realized sufficiently rapidly.

Shifting from the neutral range zero into the low range 1 advantageously takes place when the following conditions exist:

$$i_{var} \text{ near UD AND } n_{actual} \approx 0.$$

Problem 4:

An advantageous possibility for solving the problem of lack of comfort during the range shift is explained below:

It has become apparent that comfortable range shifts advantageously must take place as a function of the type of shift (tractive/retarding/up/downshift) before or after the shift point. The reason for that is that at a shift, according to the sign of the slippage, acceleration, or retardation power is released. A shift strategy is advantageous in which acceleration power is constantly released during traction shifts and retardation power is constantly released during retarding shifts.

Figure 17:
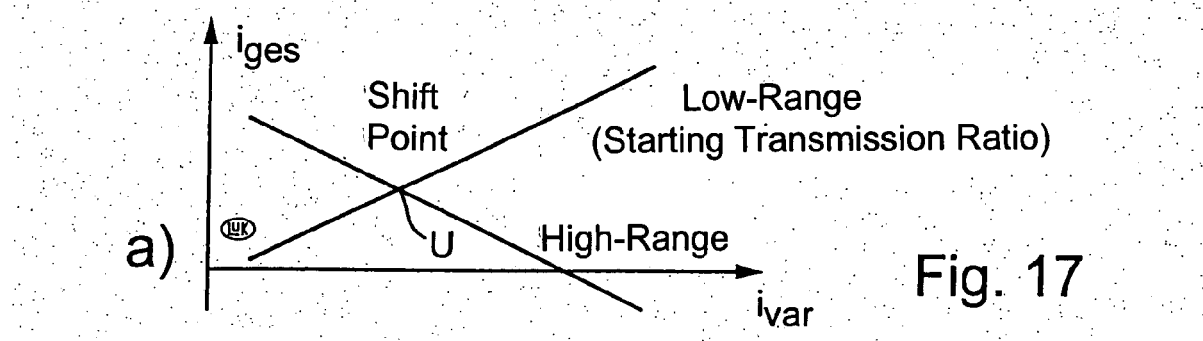
FIG. 17 shows a transmission ratio diagram with various shift strategies.
Figure 17:
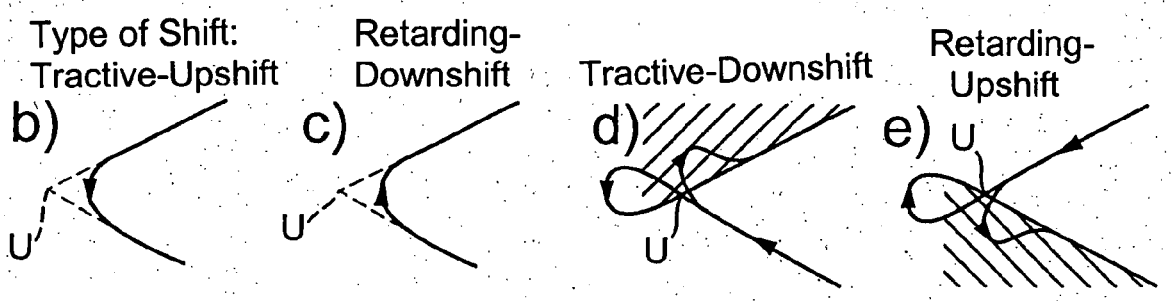

The conditions are illustrated in FIG. 17:

FIG. 17*a* shows the overall transmission ratio $i_{ges}$ of the power-branched transmission as a function of the transmission ratio $i_{var}$ of the variator. The low range corresponds to high transmission ratios. The high range corresponds to low transmission ratios. At the shift point U, the overall transmission ratio is independent of whether the low range or the high range is activated.

FIG. 17 parts b, c, d, and e show the various shift strategies:

At a tractive upshift (b), a shift from the low range into the high range takes place before the shift point. At a retarding downshift (c), a shift takes place from the high range into the low range before the shift point. With a tractive downshift (d), the shift point in the low range is overshot, subsequently a shift into the high range occurs in that the shift point U is once again overshot. At a retarding upshift (e), the shift point U is overshot in the high range and subsequently shifts to the low range. The sectioned regions at d) and e) in each case represent a power criterion that must be fulfilled so that a shift takes place or so that the initially disengaged clutch is engaged. The criterion means that acceleration power is released at traction shifts and retardation power during retarding shifts. Two trajectories of possible comfortable shifts are drawn in d) and e).

Figure 18:
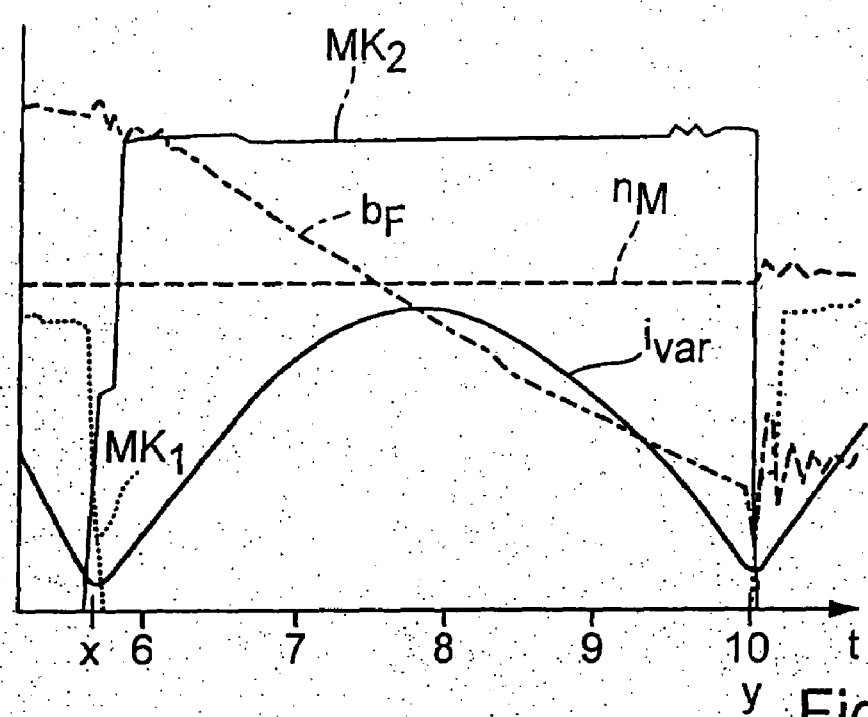
FIG. 18 and FIG. 19 show diagrams for explaining the effectiveness of a shift strategy.

FIG. 18 shows an example for a disadvantageous shift. The course of the transmission ratio $i_{var}$ of the variator, the torque MK1 that is transmittable by clutch K1, the torque MK2 that is transmittable by the clutch K2, the engine rotational speed nM and the motor vehicle acceleration bF are represented over time.

A tractive upshift at $i_{var}$ of 0.505 takes place at point in time x, hence shortly before the transmission ratio shift of 0.5. The clutch torque $M_{K1}$ goes to zero. The clutch torque $M_{K2}$ goes to a high value (the clutch engages). The engine rotational speed $n_M$ and the motor vehicle acceleration $b_F$ have only slight oscillations or jerks. A tractive-/downshift takes place at point in time y, likewise before the transmission ratio change. The engine rotational speed and the motor vehicle acceleration show clear oscillations or clear jerking.

Figure 19:
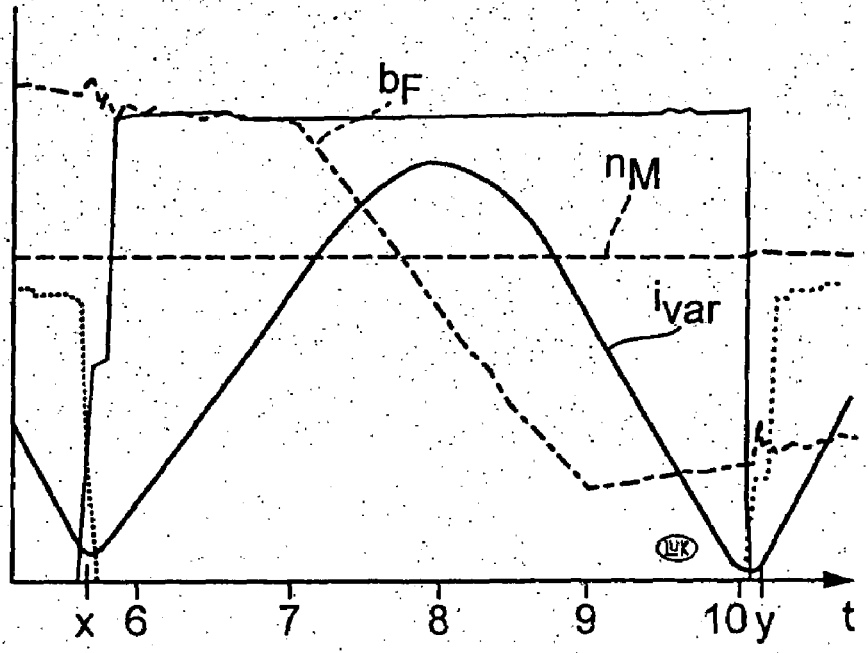

FIG. 19 shows a tractive upshift like FIG. 18. Nonetheless, $i_{var}$ is less than $i_{var}$ in the case of FIG. 18 at point in time y, during the tractive downshift at the point in time y, as a consequence of the use of the strategy represented in FIG. 17. The motor vehicle acceleration and the engine rotational speed show significantly smaller oscillations, which indicates improved comfort.

Problem 5:

With a transmission with the structure in accordance with FIG. 14 with a transmission ratio $i_1$ of the planetary transmission 14$_1$ of, for example, –2.5, and a transmission ratio $i_2$ of planetary transmission 14$_2$ of, for example –1.5, as can be utilized for high torque passenger car engines, it is apparent that during adjustment internal transmission rotary masses consume or deliver extremely large and variable powers during their acceleration or retardation. By the change of that power, a change in tractive force felt to be uncomfortable arises that can lead to a tractive force interruption. The change in transmission ratio of the transmission then takes place very sluggishly, in particular in the power-branched operation. Moreover, shifts during rotational speed gradients, for example KICK-DOWN downshifts, are significantly more uncomfortable than similar shifts without rotational speed gradients.

The causes for the above-mentioned problems are transmission internal rotary masses, in particular the rotary mass of the output-side disk pair of the variator, which requires a great acceleration power during a transmission ratio adjustment. That power is lost to the tractive force and the changes, for example at shift point U, bring about a jerk.

Design-related remedial measures consist in a suitable choice of transmission ratios of the planetary transmissions with otherwise identical transmission properties. It is advantageous if $i_1$ is small and $i_2$ is large. Furthermore, it is advantageous to work with reducing gear steps rather than increasing gear steps, that is, reducing gear ratios before the input side disk pair. The output side disk pair should be arranged coaxially with the sun gear of the planetary transmission 14$_1$. A low rotary mass in the power branch parallel to the variator is also advantageous.

The following improvement possibilities exist with regard to the transmission control (software scope):

the torque tracking of the shift clutches must take the effective inertia into consideration.

the engine engagement must take the jump of the effective inertia at the shift point U into consideration.

the driving strategy must dynamically reduce the rotational speed gradients with a tractive force concentration.

In the event of an unfavorable choice of planetary transmission ratios, for example $i_1=-2.5$ and $i_2=-1.5$, the software-side measures for control do not suffice to attain an acceptable comfort level.

Good results were obtained with the control strategy already explained further above, that is an overall regulator concept in which the engine target rotational speed plays a decisive role and the subordinate modules regulate the target rotational speed. The adjustment regulator 52 and the shift module 60 (FIG. 10) interact so that the shift takes place at the right time and the adjustment regulator correspondingly reverses polarity during a shift.

Figure 16:
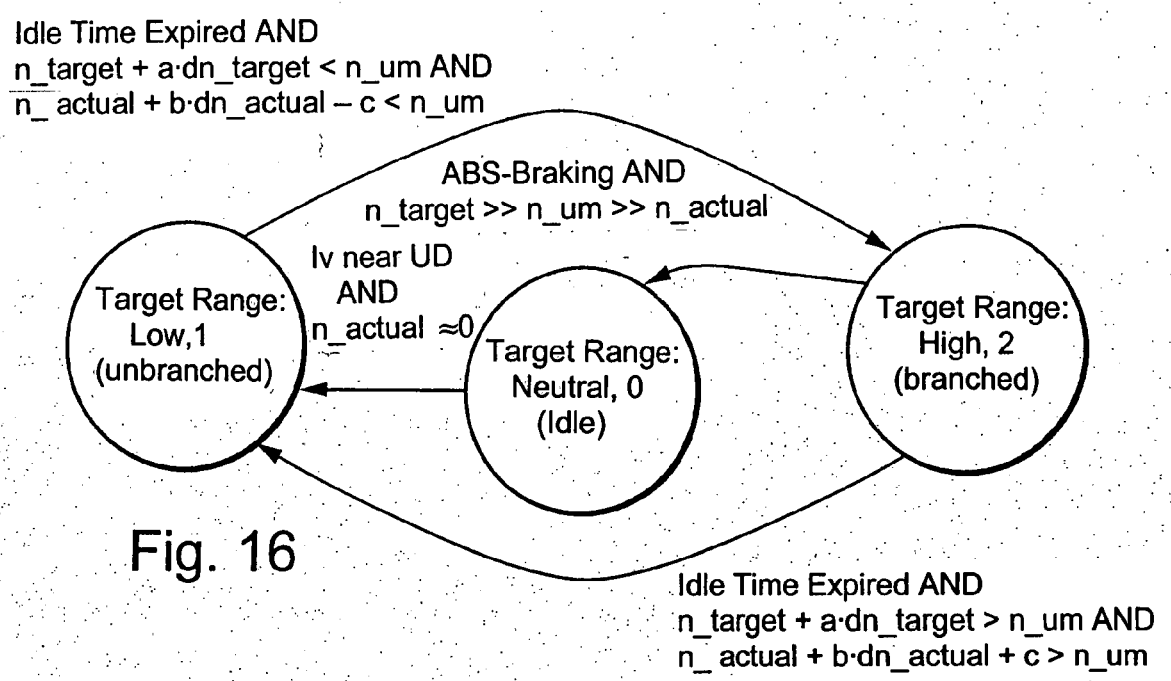
FIG. 16 shows the representation of a shift strategy in the form of an automated status mechanism.

Both transmission ratio ranges are implemented as two conditions of an automated mechanism (FIG. 16). The shift process is part of the respective range conditions and takes place by counting a variable u up or down.

The decision on the implementation of a shift is made on the basis of a rotational speed criterion. Thereby a shift rotational speed is calculated. If the current rotational speed (plus D portions) and the target rotational speed (plus D portions) lie on the other side of that shift rotational speed, the condition is changed and the shift is therewith triggered.

The tractive upshift always takes place through the D components and additional addends before the shift point, and the tractive downshift always takes place after the shift point (cf. FIG. 17). The shift variable u (that, for example, can assume values between 0 (unbranched operation) and 1000 (branched operation)) indicates in which range straight driving should take place and represents an interface variable for other modules. The shift is conducted by upward or downward incrementing of the variable u in the condition automation. The variable u is continuously taken into consideration in several positions:

in the calculation of clutch torques, in the calculation of variator disconnections ("reversal of poles" by reversing the system deviation), in the manipulations of the adjustment regulators (for example, cancellation of I components), in the calculation of the variator torque, and in the calculation of rotational speeds.

The respective clutch torques are calculated, as is known, on the basis of the engine torque with the aid of transmission-ratio-dependent kme factors. Thus, the first control clutch K1 (FIG. 14) acting as a brake must be engaged in the UD with a multiple of the engine torque, but at the shift point U only with the engine torque itself. The engine torque is thereby a dynamic engine torque that takes into account rotational speed changes. The dynamics of the shift are achieved through a dependency of the values of the variable u, that is, the coordination of the shift takes place on the basis of, respectively, a characteristic curve as a function of u for each clutch and on the basis of the logic for upward/downward incrementing of u. The disengagement of a clutch takes place faster than the engagement.

The engine engagement is taken into consideration in the condition automation. The compensation of the inertia jump takes place proportionally to the rotational speed gradient. In the branched region, a transmission-ratio-dependent function is added, and in the unbranched region, a timewise-limited (for example by two half waves) active jerk damper can advantageously be utilized after a shift.

Another possibility of solving the problem of adjustment inertia of the power-branched transmission, for example the design in accordance with FIG. 14, consists in deliberately changing the rotational speed gradient in branched operation in such a way that the acceleration power for internal transmission rotary masses changes less, or changes the rotational speed gradient in branched operation in such a way that the acceleration power changes unvaryingly or constantly at the output of the transmission (hence increases linearly at a tractive downshift). That leads, for example at a tractive downshift, to a non-linear, but in that way jerk-minimized rise of engine rotational speed; slow before the shift, subsequently faster.

Figure 20:
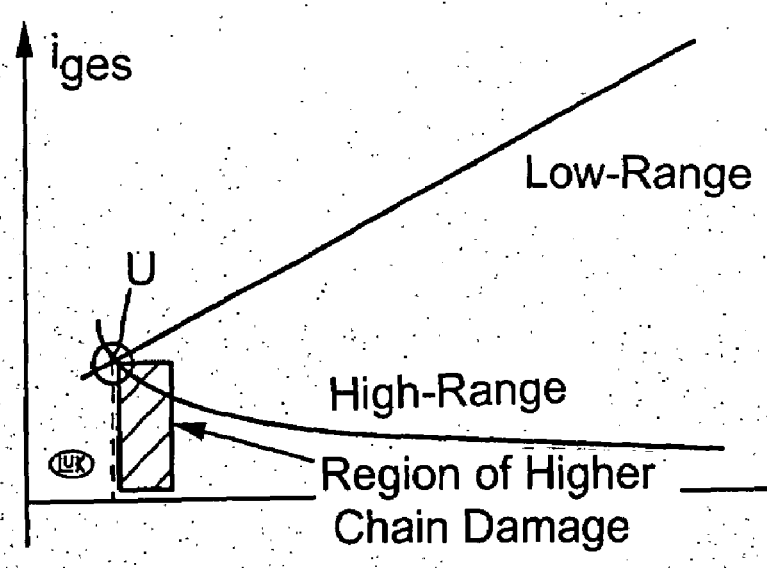
FIG. 20 shows a transmission ratio diagram for explaining the avoidance of high chain damage.

Problem 6:

In the region of the shift, or in its vicinity, it can be thoroughly relevant for damage to the endless torque-transmitting means, for example a metal chain, whether driving is taking place in the low transmission ratio range or in the high transmission ratio range (unbranched or branched operation). In a power-branched transmission with a transmission ratio behavior in accordance with FIG. 20, the branched operation generally has a higher chain damage than the unbranched operation.

The problem described can be solved as follows:

When driving at an operating point in the vicinity of the range shift U, it is possible to shift selectively into the region with low chain loading. In a transmission in which an unbranched operation exists during slow travel and subsequently a branched operation exists, a shift into the unbranched range with low chain damage can be forced by an overriding driving strategy that is implemented, for example, in module 60 (FIG. 10). In that way slightly higher engine rotational speeds are permitted under certain circumstances, which the customer, however, does not find uncomfortable.

It is apparent that the approaching operating point made available in the wear-favorable region must make the same tractive force or wheel power available as the originally-selected region with higher chain damage. With an engine control system with E-gas (electronic throttle valve), the new operating point can be approached through the assistance of engine management.

In transmissions with Tiptronic shifting (manual shift of transmission ratio steps), chain damage can likewise be taken into account so that regions with power branching near the range shift are avoided.

The present strategy is advantageous with all variator designs with frictionally-engaged elementss.

Problem 7:

If the target transmission ratio or the target rotational speed is situated in the region of the range shift U, oscillatory shifts can arise with small changes in the target rotational speed or the target transmission ratio that also should be avoided from the aspect of chain damage.

Figure 21:
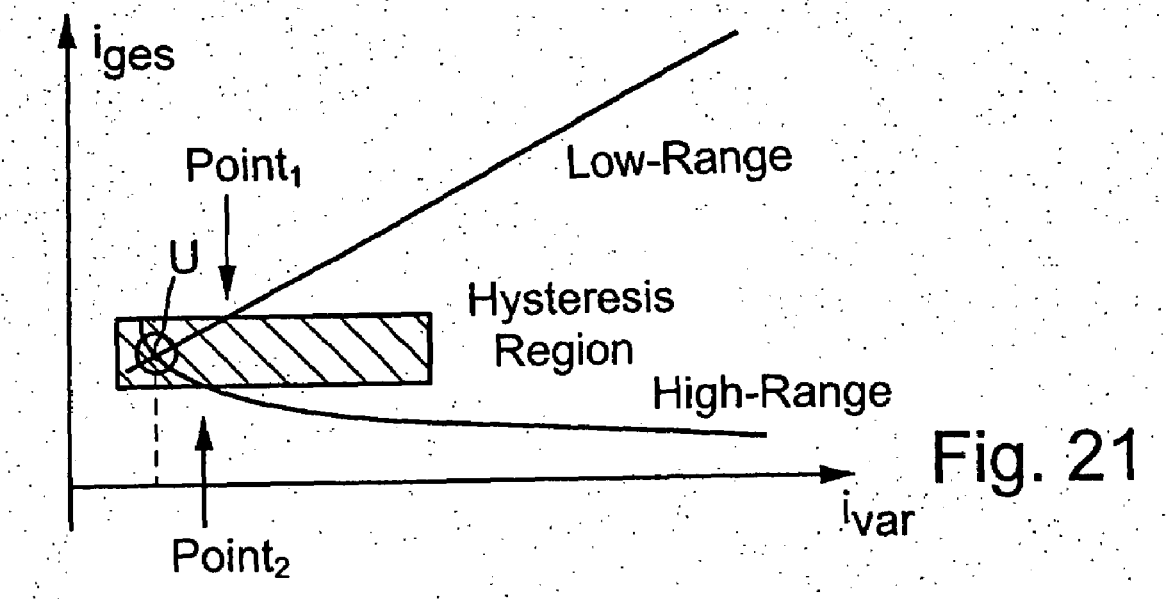
FIG. 21 shows a transmission ratio diagram for avoiding shift oscillations.

A first approach for a solution to the above-mentioned problem lies in that a downshift into a previous operating range is first implemented when the desired target transmission ratio lies significantly removed from the shift point U, that is, a defined hysteresis region is being vacated. That is shown in FIG. 21. The hysteresis region can be given as a differential transmission ratio or as a differential rotational speed. The target transmission ratio is limited to the transmission ratio of the variator at its end stop. Higher rotational speeds can indeed arise according to operating points; but a range change is avoided.

EXAMPLE

A shift into the unbranched region (low branch) is only allowed when the target overall transmission ratio $i_{ges\ target}$ is larger by at least one Δ value than the transmission ratio at which the range shift U takes place with rotational speed equality.

When a range change takes place because the target transmission ratio is greater than the hysteresis region, the target transmission ratio should be approached in a suitable manner, for example, through linear reduction of the transmission ratio difference $\Delta i_{ges}$.

An alternative or additional solution to the problem can lie in that a range change takes place only after expiration of a predetermined time period since the last range change.

A still further or additional solution can lie in that a downshift into the old operating range only occurs when the driver expresses the wish for it through an appropriate signal, for example operates the accelerator pedal since the last range change, operates the service brake since the last range change, the transmission selector lever etc.

Problem 8:

With belt-driven conical pulley transmissions in the stationary condition, an equilibrium of forces between the contact pressure force arises on the two conical disk pairs. That means that a specific ratio of forces between contact pressure forces is necessary in order to keep the transmission ratio constant at a specific input rotational speed and a specific input torque. That ratio of forces is, among other things, a function of the rotational speed with the effective torque. If the ratio of forces deviates from the stationary value, a transmission ratio adjustment occurs.

In power-branched transmissions with range shift, a torque jump arises as a consequence of the power-branching during the range shift. During that torque jump, under certain circumstances the torque approaches a zero crossing. In the phase of the torque jump, on the one hand a short-term contact underpressure and on the other a loss of comfort can occur. Based on the contact underpressure, damaging slip occurrences cannot be ruled out. Through the change in the torque acting on the conical disk pairs, undesired or uncontrolled transmission ratio adjustments can further occur, which have a detrimental influence on comfort.

A solution to the above-mentioned problem consists in applying contact overpressure to the conical disk pairs during shift of the transmission ratio ranges. The danger of slippage is avoided through such contact overpressure. Since the contact overpressure takes place for only a short time, neither fuel consumption nor service life detriments are to be expected. A range shift, as further explained above, can be determined in advance. That results in the possibility of timely increasing the contact pressure.

It is particularly advantageous not to reduce the contact pressure while the torque diminishes in amount for a short time during the sign change.

Quite generally, it is considered as true in connection with belt-driven conical pulley transmissions regardless of rotational speed and torque that the ratio of forces moves in the direction of 1:1 because of contact overpressure. With a strong contact overpressure, a change in torque consequently brings about only a comparatively slight change in the stationary ratio of forces, that is, through an excessive adaptation, the ratio of forces on the conical disk pairs changes significantly less than without contact overpressure. The torque jump therewith has less of an effect on the transmission ratio of the variator during the range shift, and uncontrolled transmission ratio adjustments can be avoided.

The buildup as well as the reduction of contact overpressure can be realized by the most varied of functions, such as through a leap, a ramp, a PT1 function, etc.

Figure 22:
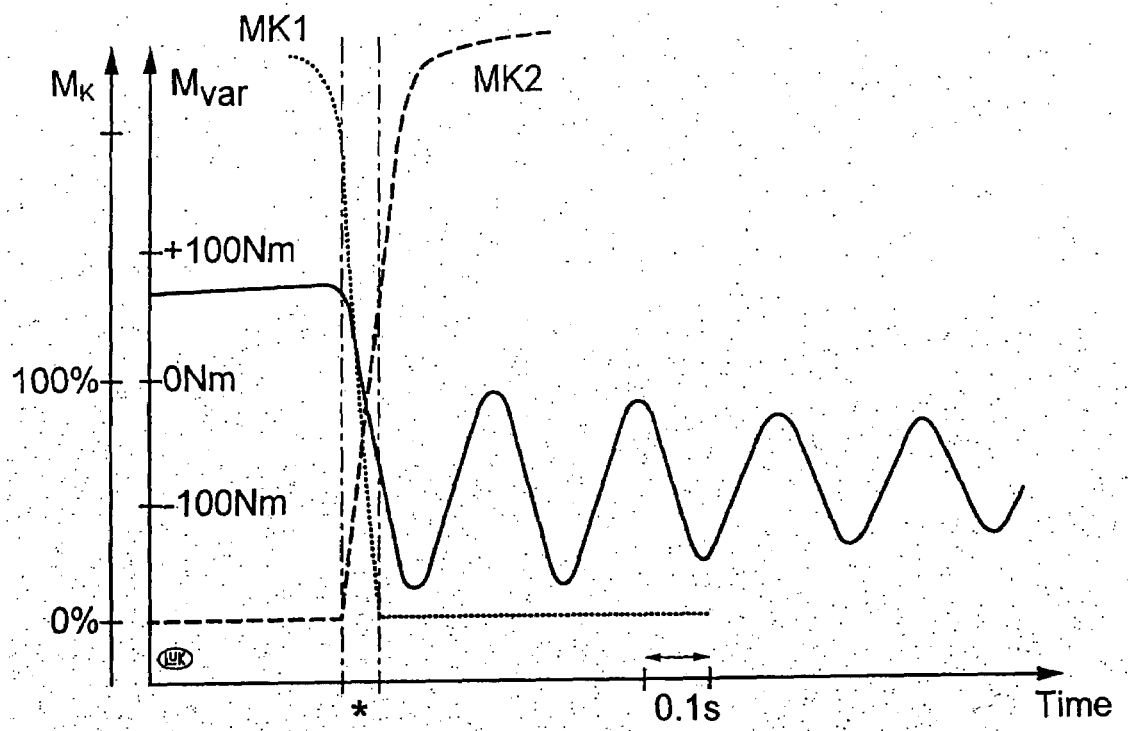
FIG. 22 and FIG. 23 show diagrams for explanation of an advantageous operation of the control clutches.

Problem 9:

With power-branched transmissions, especially such in which the direction of torque transmission in the variator is different in the two transmission ratio ranges of the power-branched transmission, there exists the danger of greater damage to the endless belt chain when shifting since the tractive force overshoots. FIG. 22 clarifies the conditions. The abscissa represents the time, the ordinate designated with $M_K$ designates the transmittable clutch torque of control clutches K1 and K2, the ordinate designated with $M_{var}$ designates the torque transmitted by the variator.

Figure 6:
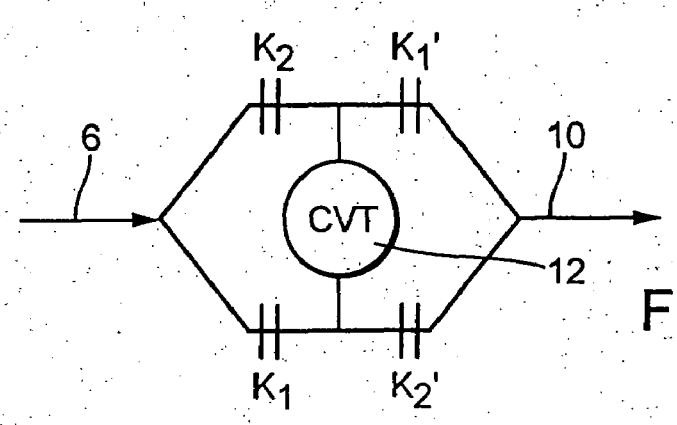
Figure 7:
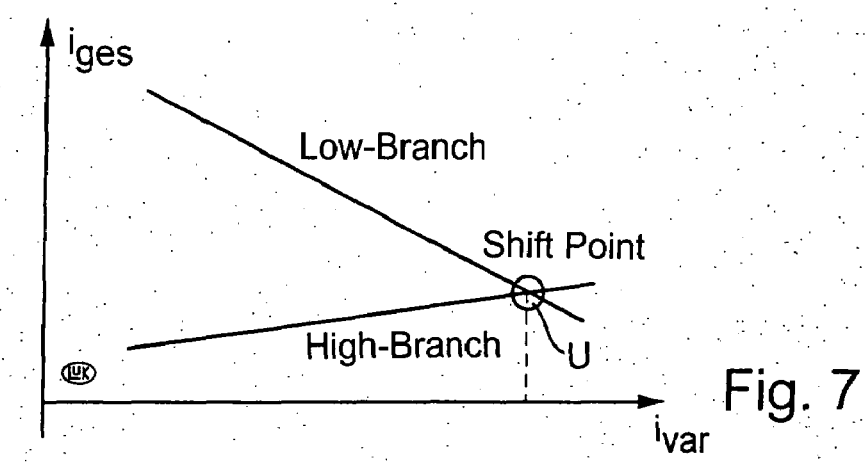
Figure 8:
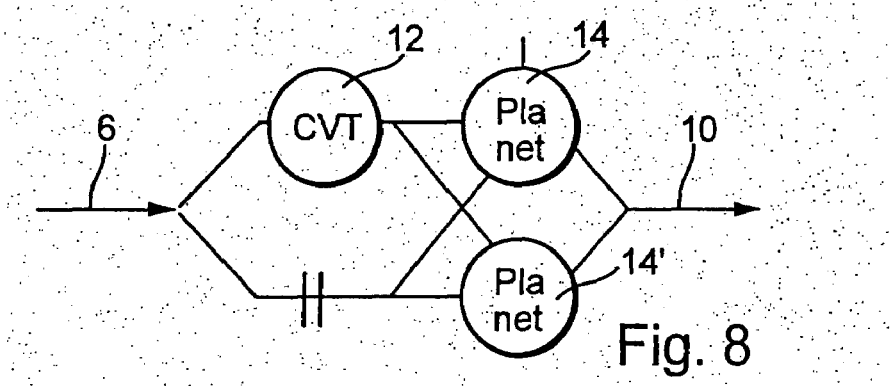
Figure 9:
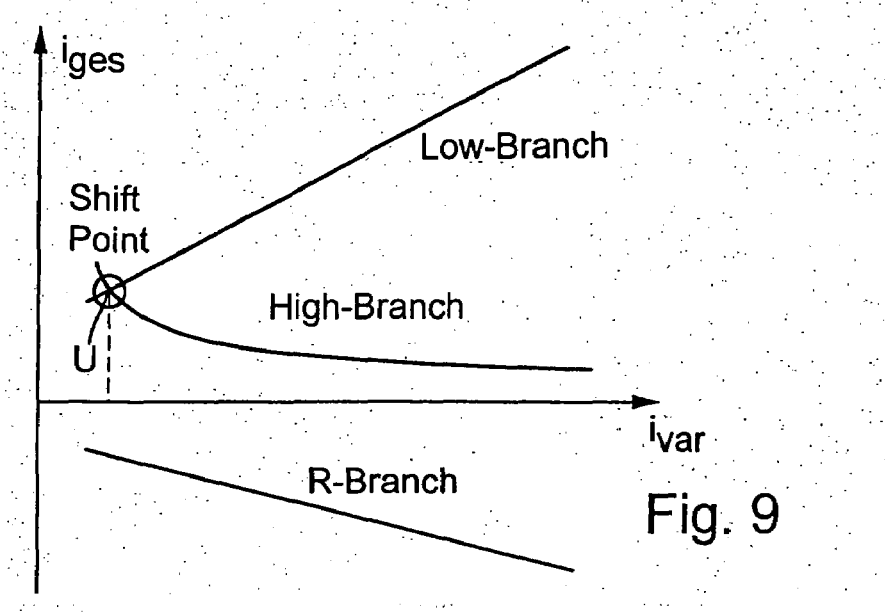

In the example represented, a power-branched transmission is assumed in which the range change is associated with a reversal of the direction of torque transmission, although no transmission ratio or rotational speed jump takes place (cf. FIG. 6).

The motor vehicle drive train reacts to jump-like torque changes with jerking, that is, with a torque overshoot.

In accordance with FIG. 22, the transmission ratio range is shifted at the position marked with a star, in which a clutch or brake K1 is disengaged and a clutch or brake K2 is engaged. The torque scale $M_K$ is represented relatively, that is, 100% designates the respective torque that would be necessary under stationary conditions in order that the control clutch K1 or K2 does not begin to slip. The torque on the variator designated with $M_{var}$ changes its sign during the shift and clearly recognizably overshoots. The negative peak value amounts to ca. 200% of the torque that was available before the shift. High torques of that kind can lead to a premature failure of load-critical structural elements, such as shafts, gears, the endless belt chain etc.

In accordance with FIG. 22, the control clutches K1 and K2 are respectively engaged so strongly that a sufficient security against slipping of the clutch is achieved even in dynamic situations.

Figure 23:
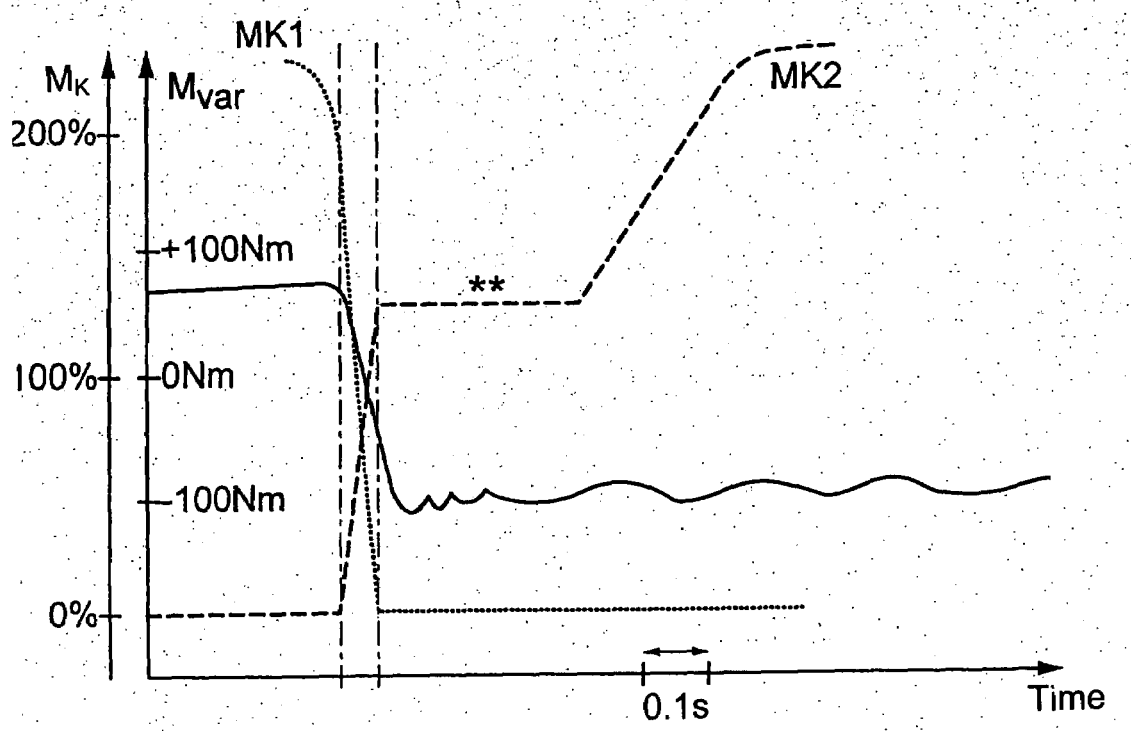

In accordance with FIG. 23, a shift of the clutches in accordance with the invention is advantageous in which the clutch (in the illustrated example K2) is engaged but slightly above the necessary extent (for example 120-130%) for a short time (marked with **) after the shift. As is clearly apparent, the negative peak torque can thereby be significantly reduced, in the example represented to about 130% of the torque that was available before the shift. The load reduction goes along with an increase in comfort because the jerking is less distinct. Numerical values from 120 to 130% during 100 to 300 msec. are advantageous.

Figure 24:
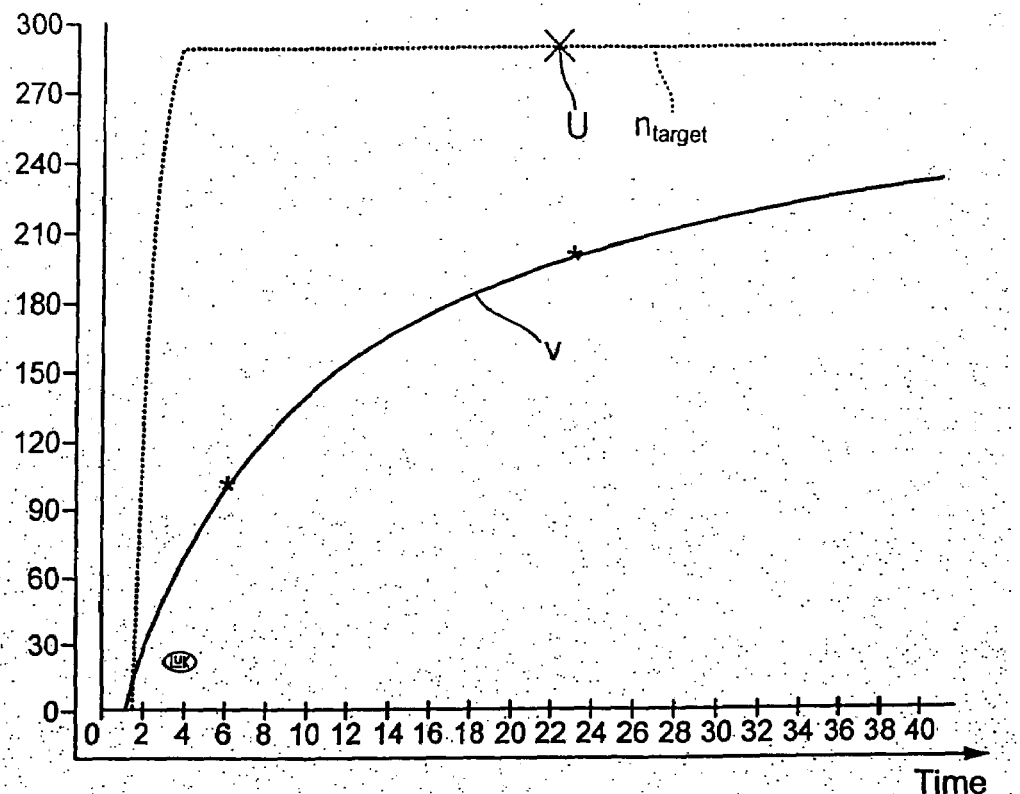
FIG. 24 and FIG. 25 show diagrams for explanation of an advantageous driving strategy by influencing a target rotational speed.

A further start to solving the problem of chain damage during range shift lies in the following:

With a fully operated accelerator pedal, a high target rotational speed $n_{target}$ is selected, typically 5,800 RPM for gasoline engines, to attain maximum engine power and therewith the maximum acceleration. That is represented in FIG. 24. Both curves represent a rotational speed path and a speed path over time. The actual rotational speed n is approximated by the adjustment regulation of the variator to the target rotational speed $n_{target}$ while the motor vehicle accelerates. At the point in time characterized by U, the range shift takes place at 5800 RPM and the greatest possible torque.

Figure 25:
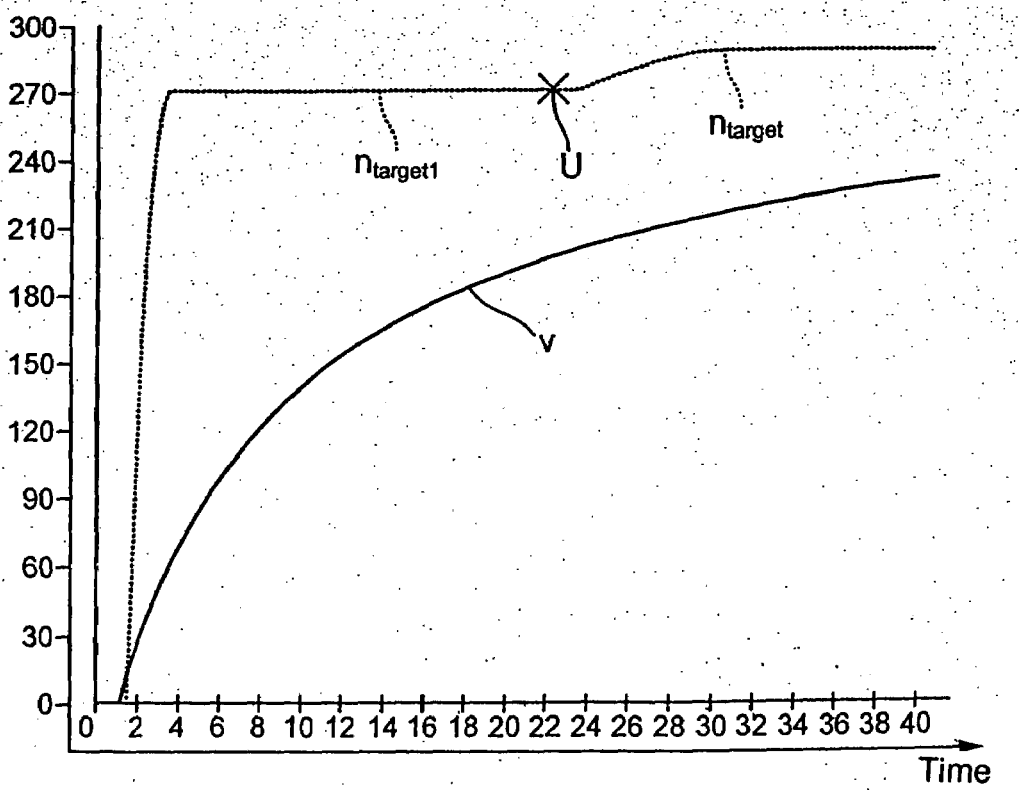

In accordance with the invention, the target rotational speed before the range shift is limited to an advantageously speed-dependent value of, for example, between 5000 and 5400 RPM. That limitation is lifted after the shift, so that the initially limited rotational speed $n_{target}$ approaches the value $n_{target}$. The shift consequently takes place at a rotational speed of only 5400 RPM in the example represented. The loss in engine power at low speeds is accepted. The lower engine rotational speed is associated not only with less chain wear, but also with better noise comfort (FIG. 25).

Problem 10:

In power-branched transmissions, a range change can indeed take place on the transmission ratio range shift point U, which is possible without a transmission ratio and therewith a rotational speed jump. In fact, however, a change in the motor vehicle acceleration occurs because lost torque and acceleration torque change internal transmission rotary masses during the shift. Such an unexpected acceleration change means a comfort impairment and can lead to oscillations, which strongly stress the variator, especially the endless torque-transmitting means.

In accordance with the invention an engine engagement takes place preferably before and after the shift to reduce or eliminate the resulting jerk.

The required power to produce the contact pressure and adjustment forces of the variator, for example through a hydraulic pump, generally changes during a shift. For example, the torque operative on the variator jumps in certain transmission structures during shifting. A jump in the full contact pressure and therewith pump torque goes along with the torque jump. At the same time losses (with increasing torque) increase, which costs additional engine power.

Engine power can be slowly reduced just before the shift through an engine engagement that is easily possible on engines with a power control element operated by an actuator, in order to then rise step-like during the shift to the original level. Additionally, or alternatively, engine power can be increased step-like during the shift in order to slowly assume the original level again after the shift.

Engine power changes can be respectively coupled with the current transmission ratio. The closer the overall transmission ratio is to the shift transmission ratio, the greater is the engine engagement. The magnitude of the maximum engine engagement acts according to the power jump operative on the engine, which as a rule can be set approximately proportional to the current engine torque. The proportionality constant can generally be specified in advance and generally amounts to a maximum of up to 5%.

A further ground for an electronic engine engagement lies in the combination of the jump of dynamic torque of the variator. Because the transmission ratio of the variator changes in opposite directions before and after the shift, torques are thereby released through changes in acceleration of the output shaft of the variator that accompany the transmission ratio range shift, which change the motor vehicle acceleration. If, for example, the output shaft of the variator was accelerated before the shift, while it was braked after the shift, the torques released bring about a motor vehicle acceleration. The engine engagement taking place during the shift takes that jump of dynamic torques into consideration, in that in the example described in has an amount that is smaller in the new transmission ratio range than in the old. The component is proportional to the amount of adjustment speed of the variator, whereby the proportionality constant results from the rotary masses on the output of the variator. Furthermore, the described dynamic torque has an accelerating action on the motor vehicle regardless of in which direction the shift point is crossed. It is to be understood that there are also transmission constructions in which the dynamic torque change associated with the shift has a braking action upon the motor vehicle, so that the engine power must be raised to compensate.

Figure 26:
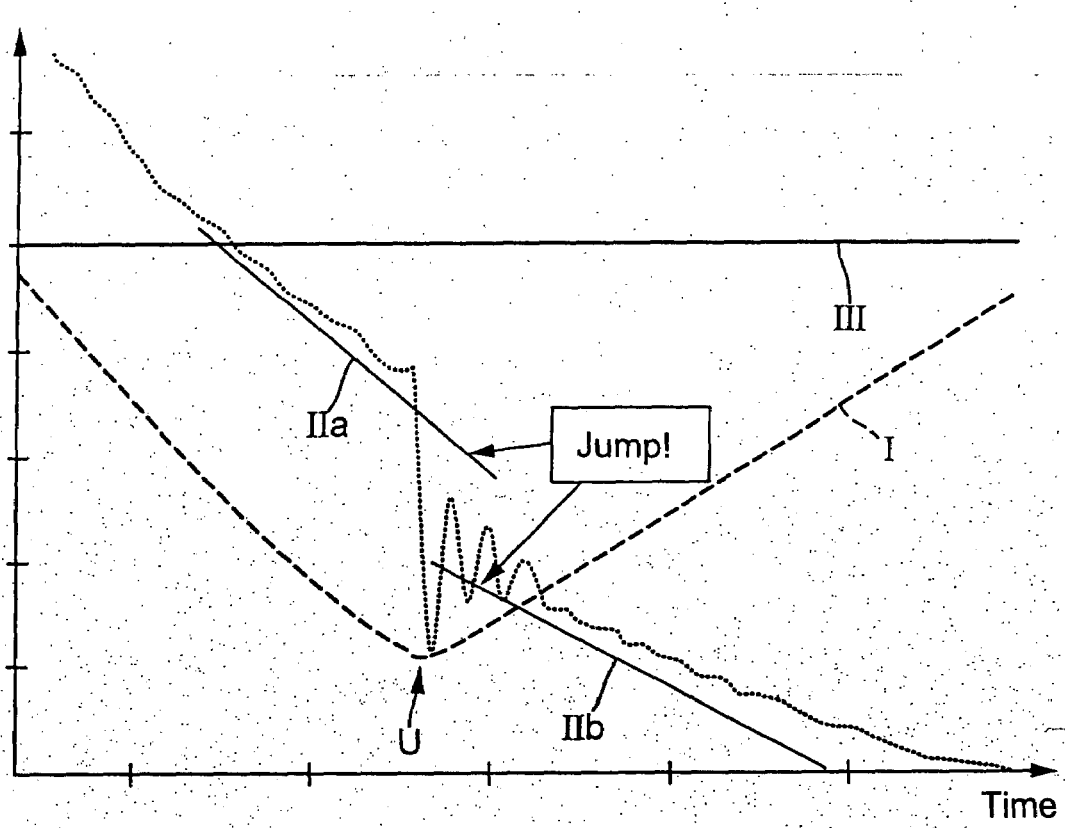
FIG. 26 and FIG. 27 show diagrams for explaining an advantageous shift strategy through engine engagement.
Figure 27:
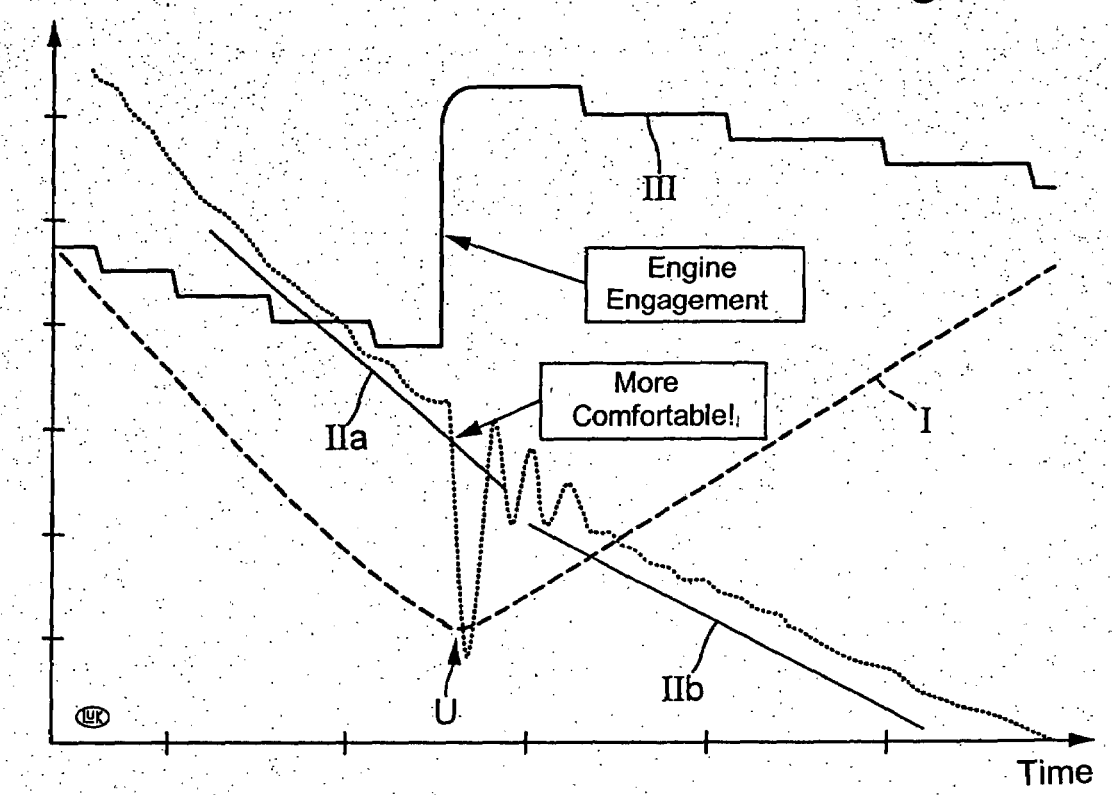

FIGS. 26 and 27 clarify the procedures:

In the figures, curve I represents the course over time of the transmission ratio of the variator of a power-branched transmission, whereby the shift point is designated with U. Curve IIa shows the motor vehicle acceleration before the shift point, and curve IIb shows the vehicle acceleration after the shift point. Curve III shows the engine power. A procedure is represented in which acceleration takes place at medium engine power.

As is apparent in FIG. 26, the motor vehicle acceleration experiences a significant jump at a shift.

FIG. 27 shows the conditions with electronic engine engagement, whereby, as is apparent, the engine power is slowly throttled back when approaching the shift point, is increased step-like during the shift, and then again slowly falling to the old value. Clearly visible is the considerably smaller jump in motor vehicle acceleration, which means a gain in comfort.

Problem 11:

One property in the regulation of the transmission ratio of power-branched transmissions in the region of the shift point lies in that the transmission ratio at first is speedily adjusted toward an end position of the variator, and subsequently adjusted away from it. In order to carry out the shift between the power-branched and unbranched ranges to be perceptible by the driver as little as possible, the adjustment regulation must include a stable and exact adjustment of the transmission ratio in addition to a high dynamic. Both demands are as a rule contrary to each other.

Figure 28:
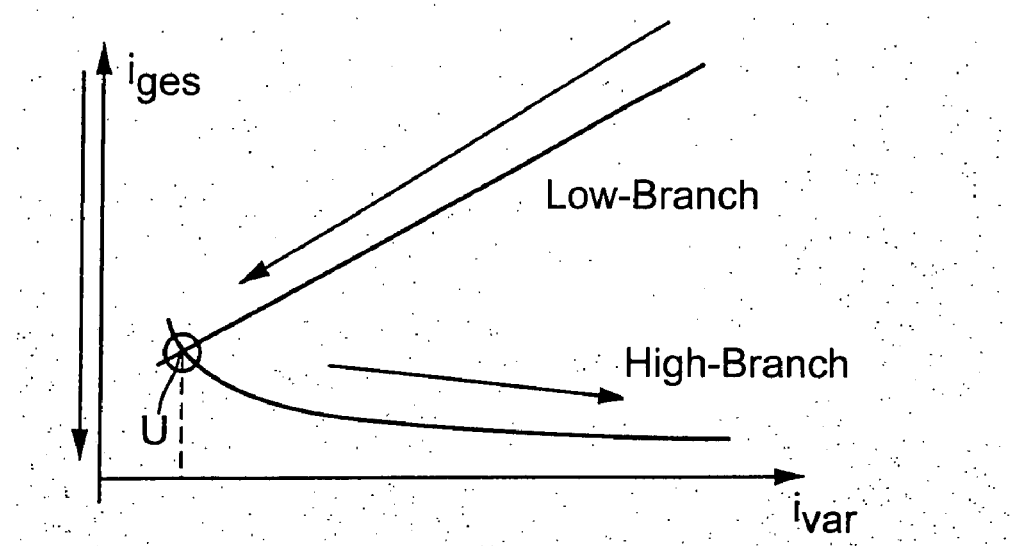
FIG. 28 shows a transmission ratio diagram for explanation of an advantageous shift strategy by the assistance of the adjustment regulator.

A solution to the problem is explained on the basis of FIG. 28:

There is shown how the overall transmission ratio $i_{ges}$ is adjusted by traversing the transmission ratio $i_{var}$ of the variator from its starting transmission ratio to its longest possible transmission ratio along the low branch and then, after a shift, once again while traversing the transmission ratio range of the variator in the opposite direction along the high branch in the fast direction. It has proven to be useful to support the adjustment of the variator out of its end position through an adjustment impulse in the region of the shift point U, which corresponds to the desired target gradient of the transmission ratio or the rotational speed. In order for the shift to be supported from a transmission ratio regulation point of view, it is useful to supply an impulse that corresponds to the transmission ratio command and is realized, for example, as a force, pressure, or current impulse. The advantage of this method lies in that a rise in the I-component of the adjustment regulator 52 (FIG. 10) does not occur as a result of the controlled method. In that way, the adjustment is realized more rapidly, and the adjustment of the target value can be realized without overshooting.

The impulse is advantageously applied in the I-component of the adjustment regulator, whereby the impulse can be triggered by the shift module 60 (FIG. 10).

Furthermore, it is beneficial if the impulse or the anticipatory control achieved therewith is increased if a large target gradient is required. Moreover it is furthermore advantageous if the applied impulse or the applied anticipatory control is greater than the desired adjustment gradient.

It is furthermore advantageous if the impulse magnitude or the anticipatory control is of the value of the I-component of the adjustment regulator before the shift. Furthermore, it is advantageous to increase the impulse or the anticipatory control if the input torque operative on the variator rises. The impulse can, for example, be proportional to the input torque.

Another solution to the above-mentioned problem consists in no longer specifying the overall transmission ratio $i_{ges}$ as the target specification for the transmission ratio regulation, but rather the transmission ratio of the variator is directly calculated and given to the adjustment regulator as a target value. That is, the calculation of the target transmission ratio of the variator is different in the low branch and high branch of the transmission ratio of the overall transmission; the operation of the adjustment regulator 52 can nonetheless basically be retained. According to the effect of the transmission ratio of the variator on the overall transmission ratio, adaptations must still be undertaken in the power-branched region, such as corrections of regulator parameters, which is possible during control by the shift module 60 (FIG. 10).

Problem 12:

The design criteria of a variator that is utilized in a power-branched transmission differ from those of a CVT transmission that is utilized alone in that the variator in a power-branched transmission can be operated in traction mode as well as in retardation with very high torques.

It is therefore advantageous to so select the surface design that the overall surfaces consisting of contact pressure surfaces and adjustment surfaces of each conical disk pair are equally large. Where that is not possible for geometrical reasons, it can be advantageous to balance the unsymmetrical surface design through an asymmetrical design, for example, of the hydraulic control, so that overall approximately equally large maximum axial forces are achievable on both conical disk sets.

Problem 13:

With a CVT transmission with power-branching, there is the possibility of realizing preselected fixed transmission ratios, similar to gear steps, in addition to the continuously variable driving operation, through a so-called Tiptronic operation. With shifts in Tiptronic operation, the manually selected shift is practically felt to be less spontaneous or less "crisp" through the continuous adjustment of the transmission ratio of the CVT transmission.

To solve that problem, there exists the possibility of supporting manual shifts by operation of the control clutches K1 and K2 in a transmission with power branching.

If, for example, a manually preselected gear lies in the power-branched region and the following manually selected gear lies in the unbranched region, then the shift between those gears can become crisper in that the clutches are not first actuated at the shift point, but rather a jump is made directly from one branch to the other branch outside the shift point by operation of the clutches, so that a specific push is introduced into the transmission. It is apparent that the shift of the control clutches can be combined in the most varied manner with the adjustment of the transmission ratio of the variator, so that the shift push receives a preselectable amplitude.

Even with gear steps that lie on the same branch, there is the possibility of achieving a crisp shift in that in each case the engaged control clutch is disengaged, then the transmission ratio of the variator is rapidly adjusted to the transmission ratio and subsequently the control clutch on the target transmission ratio is rapidly engaged.

Power-branched transmissions that contain a variator create the possibility of decoupling the variator from the output by disengaging certain control clutches. In that condition, a standstill adjustment can be carried out with standing output because the conical disk pairs continue to rotate. That is possible, for example, with the transmission in accordance with FIG. 2 when control clutches K1 and K2 are disengaged.

It is advantageous to associate a rotational speed sensor to each conical disk pair so that information is available about the rotational speeds of the input shaft and the output shaft of the variator even when the control clutches K1 and K2 are disengaged during a rapid adjustment. The transmission ratio with a rapid adjustment or standstill adjustment can take place in a regulated or controlled fashion.

Due to the decoupling of the variator from the remaining power train, the effective inertial masses for the adjustment of the variator are significantly reduced so that smaller axial forces are necessary for adjustment. That enables an improved adjustment dynamics in the regions in which the transmission ratio change of the variator only has little effect on the overall transmission ratio (for example, in the case of FIG. 3 on the high branch).

Problem 14

Figure 29:
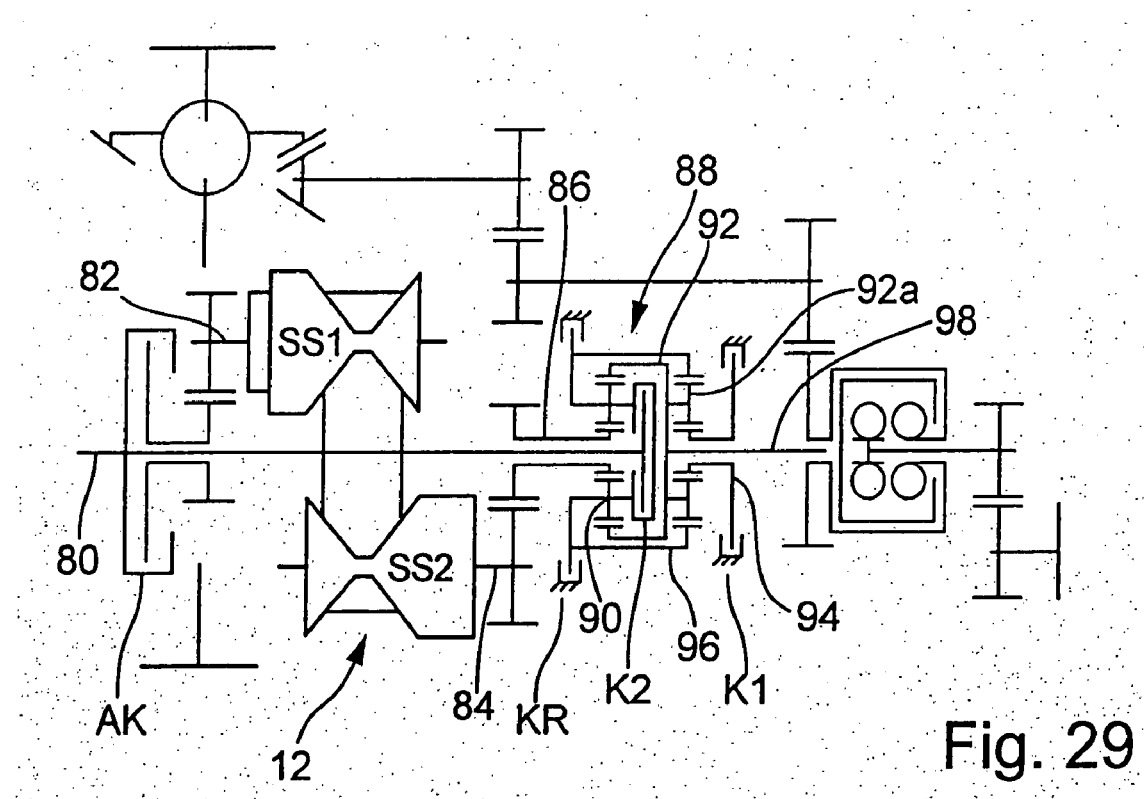
FIG. 29 shows a basic representation of a further power-branched transmission.

Power-branched transmissions with a variator generally require much installation space. FIG. 29 shows an advantageous embodiment of a power-branched transmission.

A input shaft 80 driven by an internal combustion engine (not shown) can be brought into rotary engagement with the input shaft 82 of a variator 12 through a starting clutch AK. The output shaft 84 of the variator 12 meshes with an input sun gear 86 of a planetary transmission 88 constructed as a summing transmission. The input sun gear 86 is in rotary engagement through the planet gears of a first planet carrier 90 with a first ring gear 92, which simultaneously forms a second planet carrier 92$a$ for associated planet gears. The planet gears of the second planet carrier 92$a$ mesh on the one hand with a second sun gear 94 and on the other with a second ring gear 96 that is non-rotatably connected or rigidly with the first planet carrier 90. The first ring gear is non-rotatably connected with an output shaft 98 which, in the example represented, is connected through a differential with the rear wheels of a motor vehicle and with the front wheels of a motor vehicle through further shafts and a differential. It is apparent that four-wheel drive is optimal. The input shaft 80 extends through the starting clutch AK, the variator 12 and the first sun gear and is connected with the drive disk of a second control clutch K2, which is accommodated in the first ring gear 92 and the second planet carrier 92$a$ and whose output side is connected with the first planet carrier 90. The rotation of the second sun gear 94 can be established through a first control clutch K1. The rotation of the first planet carrier 90 as well as the second ring gear 96 rigidly connected with it can be established using a further clutch KR that forms the clutch for driving in reverse.

A compact structure is obtained through the arrangement of the second control clutch K2 within the planetary transmission 88. It is apparent that numerous modifications of the transmission are possible. The input shaft 80 can directly be the input shaft of the variator, transmission ratio steps can be arranged differently, etc.

Figure 30:
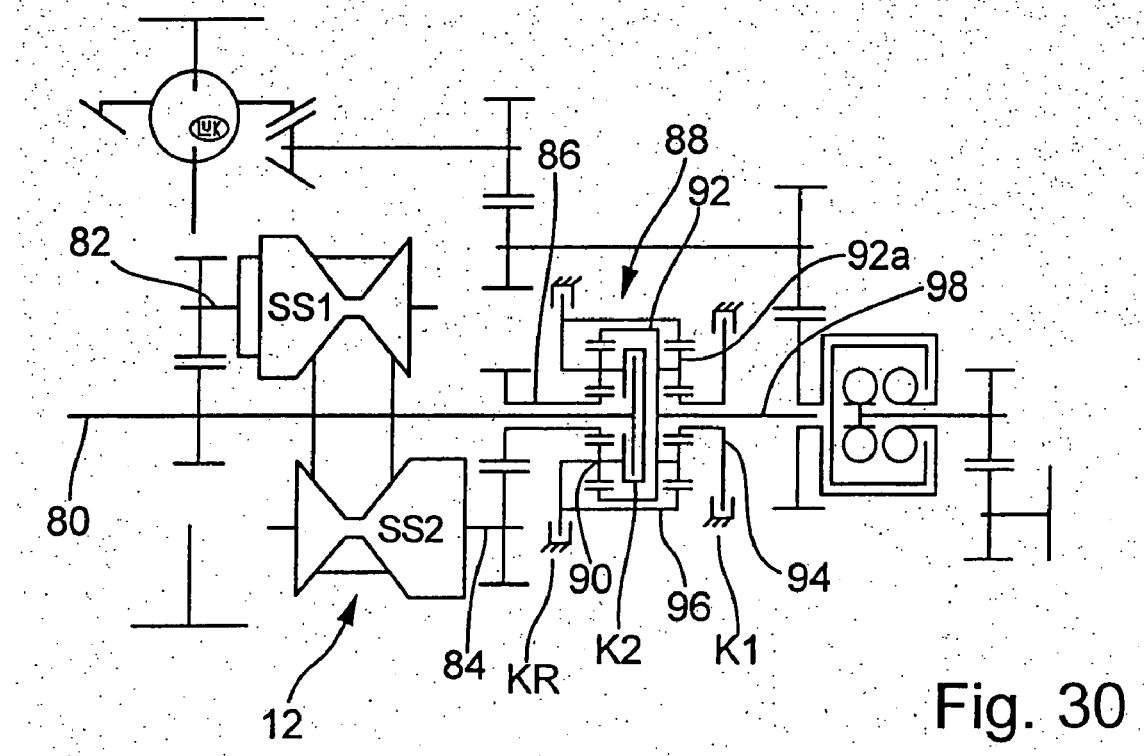
FIG. 30 shows a modification of the transmission in accordance with FIG. 29.

FIG. 30 shows a modification of the transmission in accordance with FIG. 29, in which the starting clutch AK is missing and the input shaft 80 meshes permanently with the input shaft 82. For starting up, the clutches K1 and KR are utilized jointly. In that way, the starting clutch AK in accordance with FIG. 29 can be saved.

Figure 31:
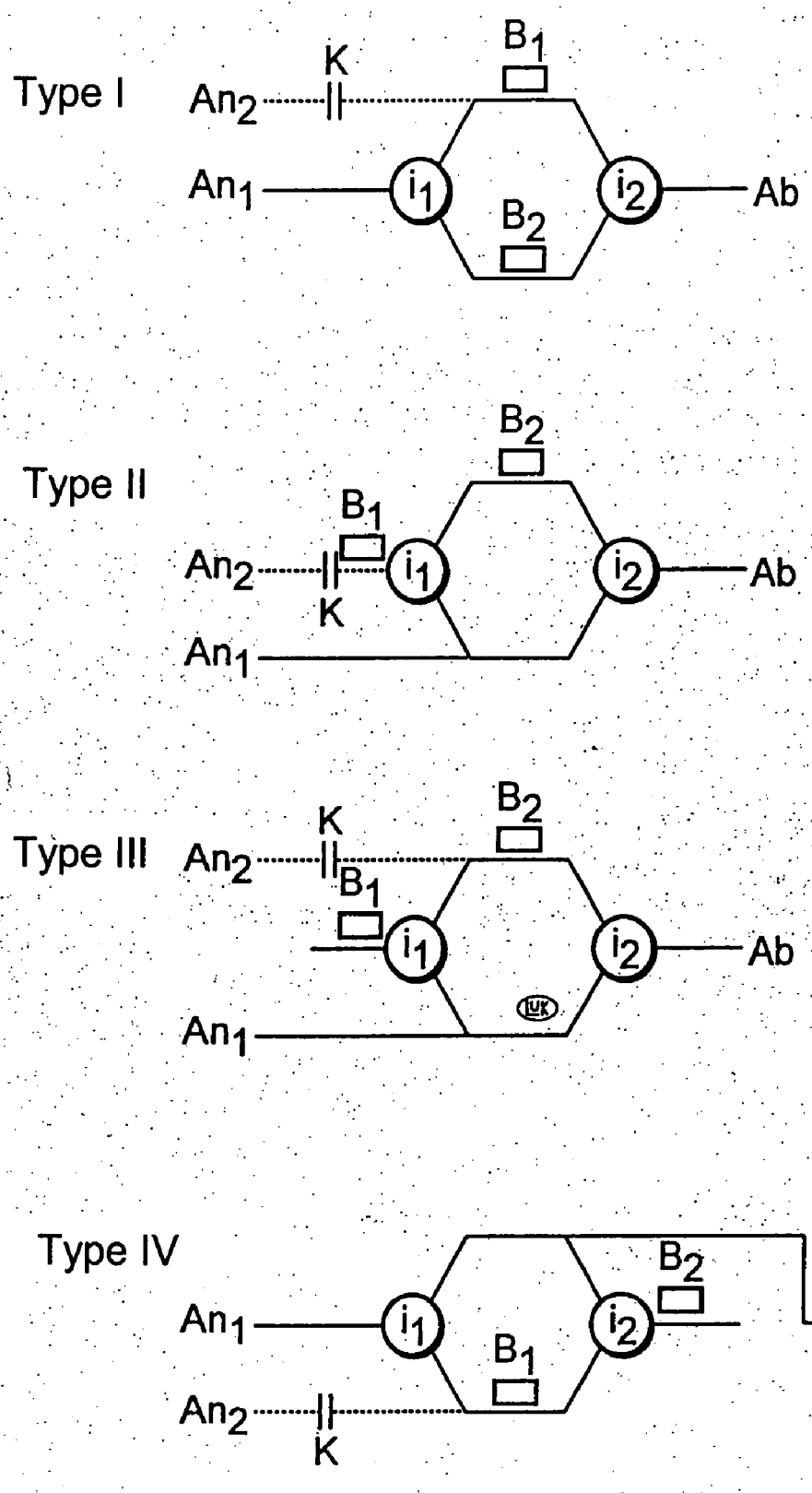
FIG. 31 shows four different configurations of coupled planetary transmissions.

FIG. 31 shows four types of power-branched transmissions with two coupled planetary transmissions in each case, with unambiguous solutions for the respective rotational speeds in such a way that the transmission ratio range of the variator not represented in FIG. 31 can be utilized doubled, similar to the transmissions in accordance with FIGS. 29 and 30, in that the transmission is operated by control in accordance with the purpose of clutches, likewise not represented in FIG. 31, in the unbranched and power-branched operation. $An_1$ designates the input shaft for unbranched and power-branched operation; $An_2$ designates the input shaft for power-branched operation that is achieved by engaging the clutch respectively designated with K. Ab designates the output. $B_1$ and $B_2$ are the brakes for reverse or forward travel. The two planetary transmissions are in each case indicated with circles (Wolf symbol) and their standard transmission ratios $i_1$ and $i_2$ symbolized in them.

As is apparent, the four types differ through the coupling of the input shafts to the planetary transmission, the coupling of the output shaft to the planetary transmission, and the arrangement of the brakes, directly apparent from the figures in each case. The coupled planetary transmissions represented can be connected together with the not represented variators into power-branched transmissions that preferably are controlled or regulated according to the previously described methods. Protection is claimed for the structure of the transmission types represented independently of their control or regulation.

Problem 15:

Especially with power-branched transmissions that contain a variator whose adjustment range is traversed in opposite directions, the problem arises as to how to carry out the adjustment, which usually takes place hydraulically, with the necessary adjustment forces with the lowest possible pump power or with a simple structure of the hydraulic system.

The object of the contact pressure/adjustment systems is respectively to produce the requisite pressure forces for the conical disk pairs so that the endless torque-transmitting means does not slip and, to the extent it is desired, a transmission ratio adjustment takes place. The pressure or contact pressure requirement is on the one hand a function of the transmitted torque. Added to that are adjustment forces for the change in transmission ratio.

Generating torque-dependent contact pressure or pressure force and the adjusting force necessary for adjustment is known as follows:

Control valves for a contact pressure unit that contains only one pressure chamber for the adjustment chamber of each conical disk pair. In that way a control program is implemented, controlled in accordance with the two hydraulic pressure regulating valves. The disadvantage of such single chamber systems is that with a change in the transmission ratio the large pressure chambers must be filled with a large oil flow, which requires a large volume and therewith a high loss pump.

Torque sensors and two chamber systems:

The torque-dependent contact pressure requirement is generated in a contact pressure unit, whereby contact pressure chambers of both disk sets are hydraulically connected with each other. The hydraulic pressure is dependent upon a torque sensor, which controls a suitable valve. The adjustment forces are produced in an adjustment unit with an appropriate adjustment chamber whose pressure actuation takes place through one or two controllable valves. With that arrangement a smaller pump can be utilized. The disadvantage is that the dependency of the contact pressure requirement on the transmission ratio can only be represented with a comparatively large effort.

Free contact pressure with double-chamber principle:

Here the torque sensor is replaced by a controllable proportional valve. The dependency of the contact pressure requirement on the torque and the transmission ratio is stored in a control unit. The above-mentioned disadvantages can be avoided. Of course, costs arise for a controllable valve for contact pressure.

When using the last-mentioned method, in which a proportional valve serves for the torque-dependent as well as additionally transmission-ratio-dependent contact pressure and the adjustment units associated with the conical disk pairs are controlled by respective independent valves, results in the advantage that a degree of freedom exists in that only two forces must be controlled with the aid of three valves.

Figure 32:
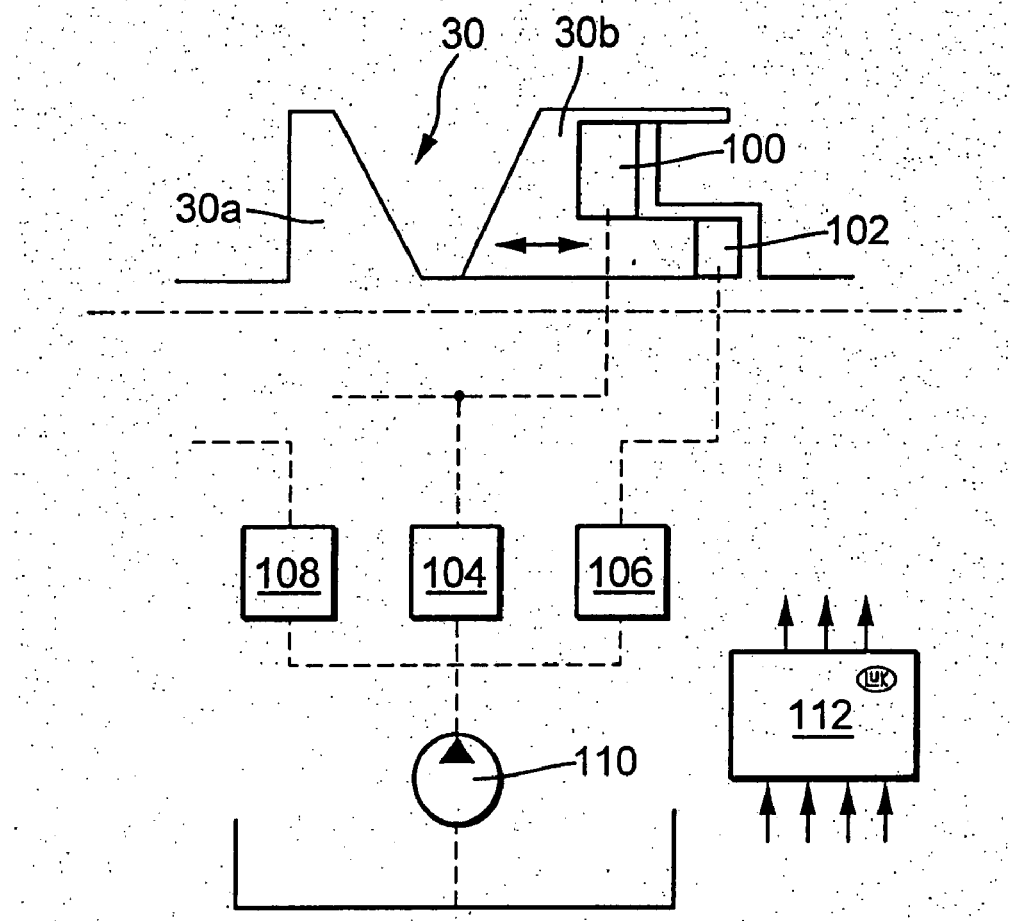
FIG. 32 shows a block diagram for explanation of the control of a variator.

FIG. 32 shows the basic structure of such a system.

A conical disk pair 30 with a fixed disk 30$a$ and an adjustment disk 30$b$ is represented. The adjustment disk is acted upon by the pressure of a contact pressure chamber 100 and an adjustment chamber 102.

The pressure in the contact pressure chamber 100 of the conical disk pair represented as well as the pressure in the contact pressure chamber 100 of the not represented conical disk pair is controlled by means of a valve 104, preferably a proportional valve. The pressure in the contact pressure chamber 102 is controlled by means of a valve 106, and the pressure in the not represented contact pressure chamber of the other disk pair is controlled with a valve 108. The valves are supplied with pressure from a pump 110. A control unit 112, the inputs of which are connected with suitable sensors and/or additional control units and the outputs of which control the valves as well as, if need be, the pump 110, serves to control the valves as well as the pump 110. The structure and function of the units described are known and are therefore not explained. It is apparent that the control unit 112 can be connected with a bus system.

It is advantageous in accordance with the invention to operate as follows in order to load the pump as little as possible or to operate with little pressure:

In a first step, the pressure forces of the disk sets are calculated in a known manner. That can take place either by determining the target forces stored in a memory, whereby the respective target force is determined as a function of the transmitted torque, the momentary transmission ratio and the desired adjustment, or also in the form of actual forces that are detected by sensors, or by a combination of both possibilities.

In a second step, the larger of the pressure forces active on the respective disk sets is determined.

In a third step, the pressures pm and pv, which are required in the contact pressure chamber and the adjustment chamber, of the conical disk pair to be acted upon with the greater force F are established in such a way that an approximate pressure equilibrium exists. For example, pm=pv=F/(Am+Av) is calculated in that step, whereby Am and Av are the surfaces of the contact pressure and adjustment chambers on that disk set pair on which the greater force F is necessary.

In a fourth step, the contact pressure pv of the other conical disk pair to be acted upon with the small force is calculated. For example, pv=(F−pm*Am)Av is calculated in that step, whereby pm is the already known contact pressure and Av as well as Am are now the surfaces of the contact pressure and adjustment chamber on that disk set pair on which the smaller force F is necessary.

Overall, it is thereby achieved that the necessary maximum force is reached with low pressure, so that the pump 110 is correspondingly little stressed and little energy is utilized.

For variators utilized in branched transmissions the situation can arise that the variator can be operated with very low pressures, because only very low torques are transmitted by it. Nonetheless, for other components of the transmission, which are not represented in FIG. 32, a higher hydraulic pressure can be necessary, for example for a starting clutch or on other shift elements.

A further use of deliberately increased pressures can be motivated by the fact that, for example, spray oiling or oil cooling is to be improved. Furthermore, it can be advantageous to maintain a slight minimum pressure in order, for example, to prevent a "running empty" of hydraulic conduits or chambers, which improves the reproducibility of the control of these chambers, or even maintains a lubrication of moving parts. With a cold transmission, it would even be desirable to worsen the efficiency for a short time by an increase in pressure, so that the transmission and if need be also the internal combustion engine reach a favorable operating temperature more rapidly.

In all these cases, it is necessary to implement a logic according to which the hydraulic pressure additionally at least covers the pressure requirement for those other components (minimum pressure).

In accordance with the invention, the minimum pressure logic is realized in that, following the above-mentioned third step the calculated contact pressure is modified in that it is increased (whereby at the same time the adjustment pressure necessary for maintaining the greater pressure force is correspondingly reduced) until either the contact pressure force attains the necessary minimum pressure or the adjustment pressure arising in the fourth step attains the minimum pressure for the other disk set.

With the previously described method, a contact overpressure can be allowed for, if namely an adjustment pressure must be reduced to zero.

The above-mentioned methods can only be implemented by software, so that they are extraordinarily economical.

A cascade valve is especially well suited for carrying out the previously described method, as it is described below on the basis of FIGS. 33 and 34.

Figure 33:
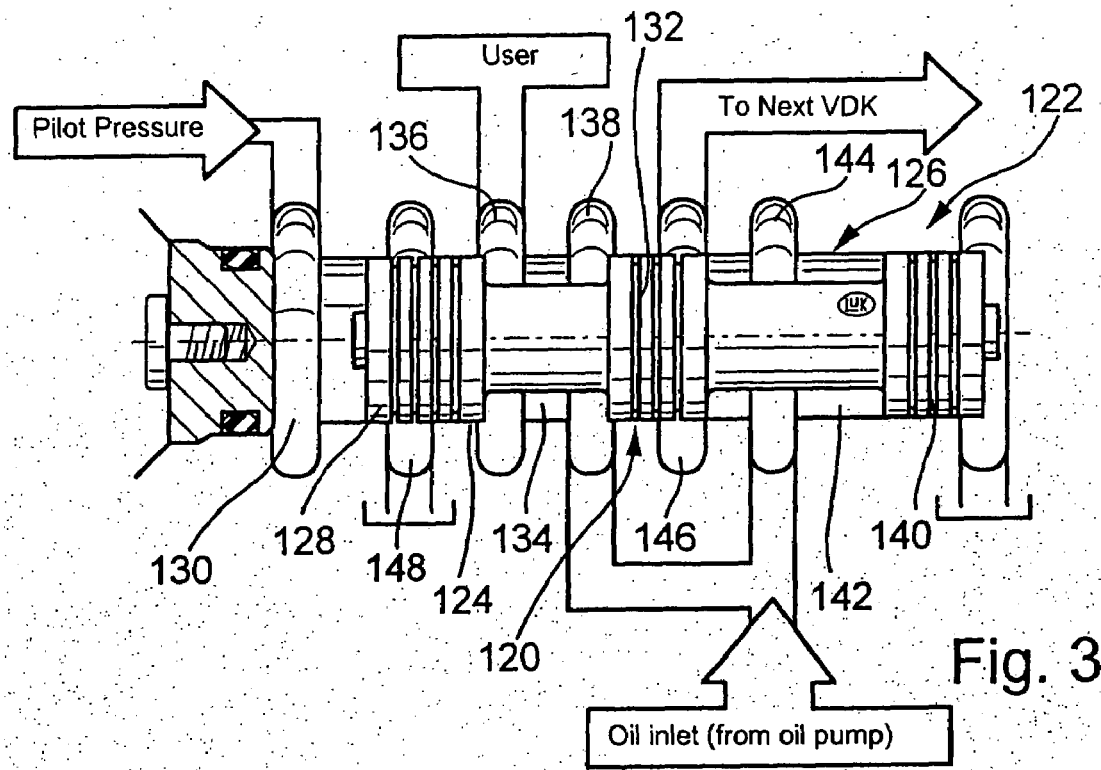
FIG. 33 and FIG. 34 show a cascade valve in two different positions and FIG. 35 shows a hydraulic circuit with cascade valves.

In accordance with FIG. 33, a cascade valve has a valve element 120 that operates in a cylindrical housing 122 that is drawn only in its interior contour and that has a staged cylinder bore 126 at 124. On the left side, the cylinder bore is closed so that a chamber 130, upon which a pilot pressure is applied, is bounded on the left side of a collar 128 of the valve element 120 guided in the segment of the cylinder bore 126 and constructed with an enlarged diameter. Between the collar 128 and a further collar 132, the valve element is constructed with smaller diameter so that a first annular chamber 134 is formed in which the position of the valve element has on its left side in accordance with FIG. 32 a first outlet 136 that can be connected to a user. On its right end in accordance with FIG. 32, the annular chamber 134 has a first inlet 138 that can be connected to an oil pump.

On the right side of the collar 132, the valve element has a shank with reduced diameter and subsequently a further collar 140 so that a second annular chamber 142 is formed.

In the position of the valve element represented in FIG. 33, the second annular chamber 142 is connected with second inlet 144 that is likewise connected with a hydraulic pump, and an outlet 146 is arranged in such a way that it is separated from the second annular chamber 142 by means of a control edge constructed on the right side end of the collar 132.

To the right side of the collar 140, a return extends away from the housing. A return 148 is likewise arranged in the region of the collar 128.

The position in accordance with FIG. 33 corresponds to a pressure control development of the cascade valve; the entire hydraulic medium flow coming from the hydraulic pump is supplied to the outlet 136 through the first annular chamber 134, whereby the pressure acting in the first annular chamber 134 counteracts the pilot pressure in the chamber 130 due to the staged cylinder bore 126 and therewith the unequally large diameters of the collars 128 and 132. If the pressure in the first annular chamber 134 becomes too large, the valve element 120 moves toward the left, owing to which the inlet into the first annular chamber 134 is increasingly engaged by the control edge of the collar 132, and the second outlet 146 is increasingly opened. The volume flow coming from the pump is consequently prestressed in the cascade valve by the pressure limiting function, and a specific pressure is set by the pilot pressure for the user downstream of the first outlet 136.

Figure 34:
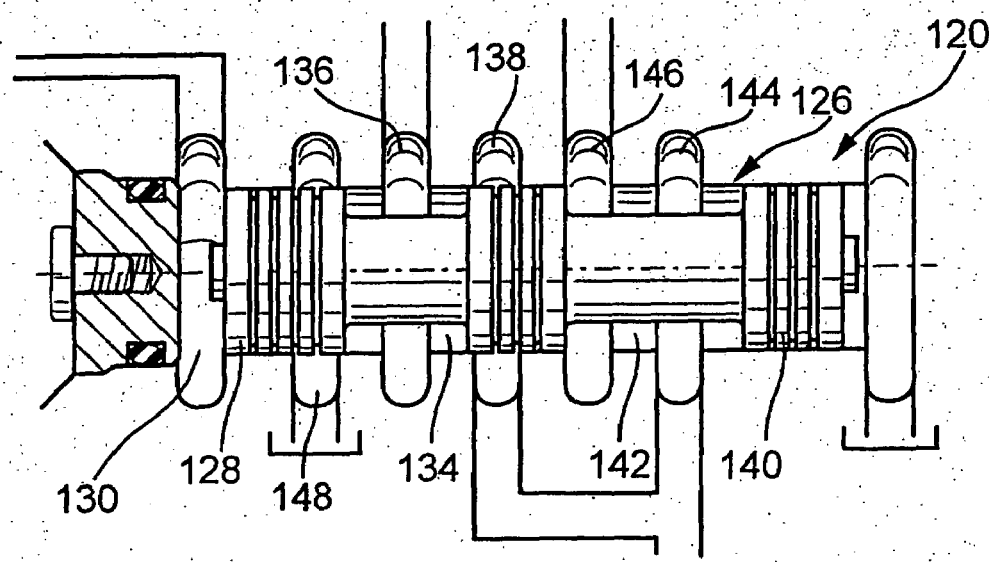

If the user pressure and therewith the pressure in the first annular chamber 134 continues to rise, the valve element 120 increasingly moves toward the left and occupies the pressure reducing position in accordance with FIG. 34, in which the first annular chamber 134 is separated from the first inlet by the left side control edge of the collar 132, and is increasingly connected with a return 148 through the right side control edge of the collar 124. The right or second annular chamber 142 connects the second inlet 144 with the second outlet 146.

It is possible through a series connection of several cascade valves to design a hydraulic control unit that requires no special valves for prestressing the hydraulic pressure. Instead, the cascade valve that requires the maximum operating pressure adjusts that itself. Previous cascade valves then enter into the pressure reducing function, and subsequent cascade valves enter with a decreasing required pressure into the pressure restricting function.

Figure 35:
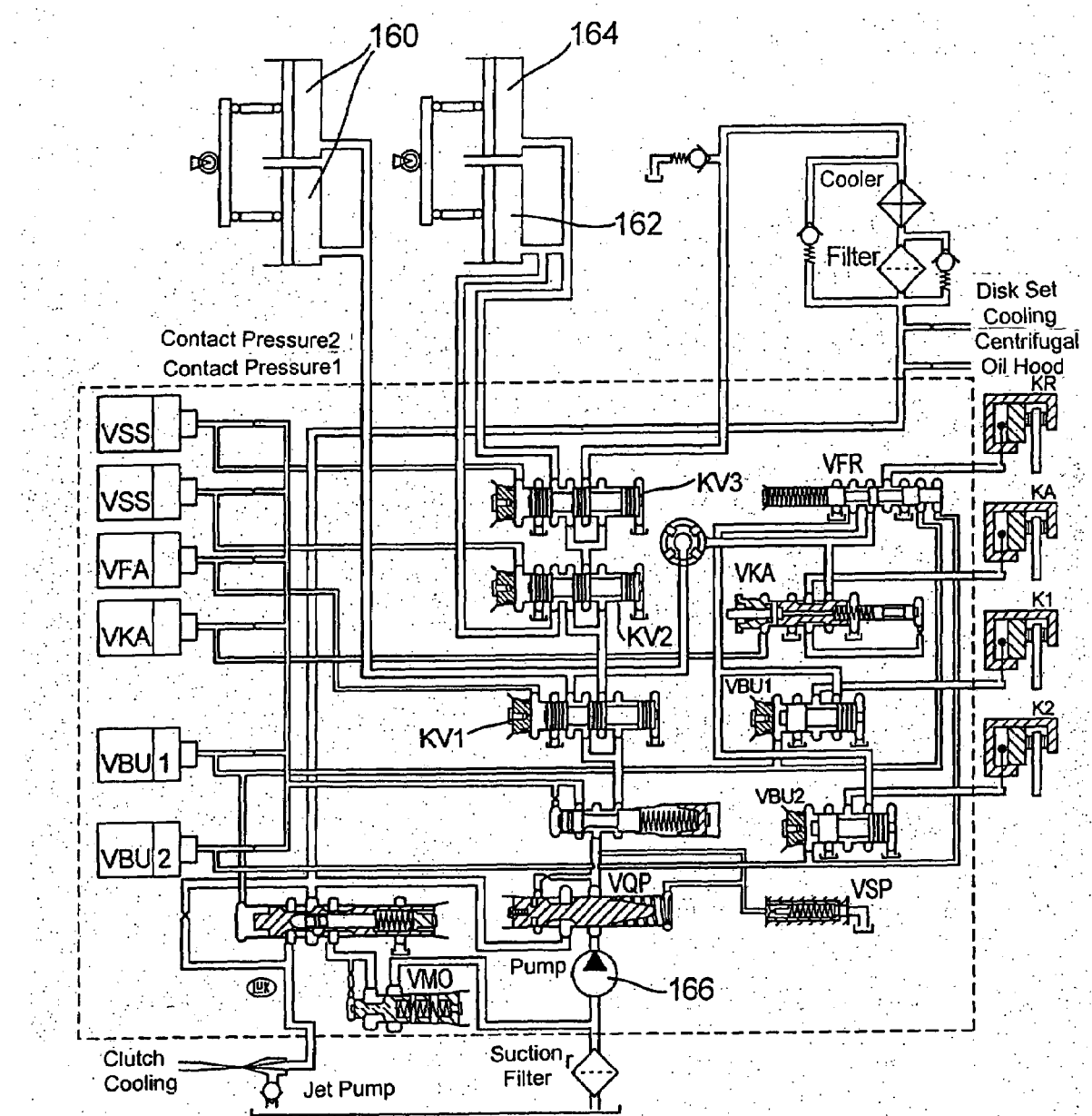

In connecting several cascade valves, it is appropriate to connect the cascade valves in the order of their importance one after the other. That means that the valve that sets the most important pressures is arranged first in the series connection. An example of such a hydraulic connection is shown in FIG. 35. A hydraulic diagram for actuation of the contact pressure chambers 160 of two conical disk pairs of a variator and the adjustment chambers 162 and 164 of each conical disk pair is represented. A hydraulic pump 166 generates a volume flow, which is limited in a volume flow limitation valve VQP, and subsequently the flow runs through a pilot pressure valve (not shown) and is supplied to the inlets of a first cascade valve KV1. The first outlet of the cascade valve KV1 is connected with the contact pressure chambers 160. The second outlet leads to the inlets of a second cascade valve KV2 whose first outlet is connected with the adjustment chamber 162 and whose second outlet is connected with the inlets of a third cascade valve KV3. The first outlet of the third cascade valve KV3 is connected with the adjustment chamber 164, and the second outlet advantageously leads to at least one unit of the variator operated in through-flow operation, for example an opening for cooling the conical disks and/or for supplying a centrifugal oil hood with hydraulic means, etc. The pilot pressures of the cascade valves are controlled through valves that are represented on the left side and electronically actuated by a control device (not represented) through which valves are also controlled that control the individual clutches K1, K2, KA, and KR of a transmission, as shown in FIG. 35.

With a hydraulic diagram in accordance with FIG. 35, the pressure in the contact pressure chambers 160 is viewed as most important so that those chambers are connected with cascade valve KV1.

A further advantage of the cascade valves depicted lies in the fact that they return hydraulic fluid flowing back from the user into the control unit in their pressure control position, so that hydraulic fluid is available for other users. That influences the volume flow balance of the control unit positively and permits the use of smaller pumps.

The problem solutions sketched above can be utilized individually and, where appropriate, in combination with one another. The range of application of the hydraulics represented and the methods for actuating the hydraulics are not limited to power-branched CVT transmissions.

The patent claims submitted with the application are formulation proposals without prejudice for attaining further patent protection. The applicant reserves the right to claim further feature combinations previously disclosed only in the description and/or drawings.

References utilized in the dependent claims refer to the further construction of the object of the main claim through the features of the dependent claim in question; they are not to be understood as a waiver of attaining an independent, objective protection for the combination of features of the referenced dependent claims.

Since the objects of the dependent claims can form their own and independent inventions with respect to the state of the art on the priority date, the applicant reserves the right to make them into the object of independent claims or partial declarations. They can furthermore also contain independent inventions that have a configuration independent of the objects of previous dependent claims.

The embodiments are not to be understood as a limitation of the invention. Rather, numerous alterations and modifications within the framework of the present disclosure are possible, especially such variants, elements and combinations and/or materials which, for example, through combination or modification of individual features in connection with features described in the general description and embodiments as well as in the claims as well as contained in the drawings, or elements or procedural steps that can be inferred by the specialist with respect to the realization of the objective and lead to a new object or new method steps or method sequences of steps by features that can be combined, also to the extent that they concern manufacturing, testing and operating methods.

What is claimed is:

1. A method for regulating the transmission ratio of a power-branched automatic transmission that includes an input shaft drivable by an engine, a variator with a continuously variable transmission ratio, a gear transmission, an output shaft and at least two control clutches through which the variator and the gear transmission can be operatively connected, said method comprising the steps of: traversing a first portion of the overall transmission ratio range of the power-branched transmission within the transmission ratio range of the variator in a first transmission ratio change direction; traversing a second portion of the overall transmission ratio range of the power-branched transmission within the transmission ratio range of the variator in a second transmission ratio change direction that is opposite from the first transmission ratio change direction; at a transition point between the first and second variator transmission ratio change directions changing the sign of at least one regulator parameter of an adjustment regulator utilized to set the transmission ratio of the variator; and changing an output signal of the adjustment regulator in accordance with a momentary value of $di_{ges}/di_{var}$, whereby $i_{ges}$ is the overall transmission ratio of the power-branched transmission and $i_{var}$ is the transmission ratio of the variator.

2. A method according to claim 1, wherein an output signal of the adjustment regulator changes its sign during the transition between the transmission ratio ranges.

3. A method according to claim 1, wherein the adjustment regulator is a PID regulating unit and the P component of the regulating unit is multiplied by the momentary value of $di_{ges}/di_{var}$.

4. A method according to claim 1, wherein an input signal of the adjustment regulator in accordance with a deviation between a target rotational speed and an actual rotational speed is changed in accordance with the momentary value of $di_{ges}/di_{var}$.

5. A method for regulating the transmission ratio of a power-branched automatic transmission that includes an input shaft drivable by an engine, a variator with a continuously variable transmission ratio, a gear transmission, an output shaft and at least two control clutches though which the variator and the gear transmission can be operatively connected, said method comprising the steps of traversing a first portion of the overall transmission ratio range of the powerbranched transmission within the transmission ratio range of the variator in a first transmission ratio change direction; traversing a second portion of the overall transmission ratio range of the power -branched transmission within the transmission ratio range of the variator in a second transmission ratio change direction that is opposite from the first transmission ratio changes direction ;at a transition point between the first and second variator transmisson ratio change directions changing the sign of at least one regulator parameter of an adjustment regulator utilized to set the transmission ratio of the variator; reducing input signals to the adjustment regulator during the transition between changes of the direction of the varlator transmission ratio ranges; and changing an anticipatory control of a difference of contact pressures of disk pairs of the variator during a transition between the transmission ratio change directions in accordance with changing torque.

6. A method according to claim 1, including the step of changing an integral component of the adjustment regulator during the transition between the transmission ratio ranges.

7. A method according to claim 1, including the following steps:
calculating an actual transmission ratio $i_{var}$ of the variator and an actual overall transmission ratio of the power-branched transmission on the basis of measured rotational speeds and a shift condition of the control clutches,
calculating an actual rotational speed $n_{actual}$ of the input shaft of the variator on the basis of overall transmission ratio and a measured motor vehicle wheel rotational speed,
calculating a change in the actual rotational speed $n_{actual}$ and a change in a target rotational speed $n_{target}$ of the input shaft,
calculating a shift rotational speed $n_{um}$ at which a shift of the control clutches must take place exactly at a current wheel rotational speed and
determining a gear change on the basis of the calculated values.

8. A method according .to claim 7, wherein shifting takes place before reaching the shift rotational speed $n_{um}$ and further shifting is possible only after expiration of an idle period.

9. A method according to claim 1, including the step of controlling the clutches based upon predetermined conditions so that the transmission transfers no torque and the transmission ratio of the variator is rapidly distorted in that condition.

10. A method according to claim 1, including the step of utilizing the control clutches for shifting between the transmission ratio ranges, wherein in the event of a transmission ratio of the variator that is outside a transmission ratio value at which the transmission ratio of the power-branched transmission is independent from the activated transmission ratio range, the control clutches are shifted in such a way that in the case of tractive shifts acceleration power is released and in the case of retarding shifts delay power is released.

11. A method according to claim 1, including the step of controlling transmission control strategy so that at least at high torques transmitted from the variator in the adjacent regions of the transmission ratio ranges operation in a transmission ratio range with lower wear of an endless torque-transmitting means has priority over the rotational speed of the input shaft.

12. A method according to claim 1, wherein after a shift from one transmission ratio range into the other, renewed shifting takes place only after traversing a predetermined hysteresis region.

13. A method according to claim 1, wherein after shifting from one transmission ratio range into the other renewed shifting takes place only after expiration of a predetermined time period.

14. A method according to claim 1, wherein a contact overpressure of disk pairs of the variator takes place during shifting between the transmission ratio ranges.

15. A method according to claim 1, wherein the torque transmission direction of the variator within the first transmission ratio range of the power-branched transmission is opposite to that within the second transmission ratio range, wherein an engaging clutch is engaged in a shift between transmission ratio ranges in such a way that the transmittable clutch torque for a short time lies slightly above the torque applied to the transmission.

16. A method according to claim 1, wherein the direction of torque transmission of the variator within the first transmission ratio range of the power-branched transmission is opposite to that within the second transmission ratio range, wherein a target rotational speed of the engine in the transmission ratio range of the transmission that corresponds to low motor vehicle speeds is limited to an upper limit that is dependent upon the motor vehicle speed.

17. A method according to claim 1, wherein while shifting between transmission ratio ranges, the engine power is changed before, during, and after the shift in accordance with different power consumption levels by control units for operating the transmission.

18. A method according to claim 1, wherein during a shift between the transmission ratio ranges the engine power is changed in accordance with different accelerations of rotatable components developing during the gear change.

19. A method according to claim 1, wherein during a shift between the transmission ratio ranges, the control clutches are actuated in accordance with accelerations of rotatable components arising during shifting.

20. A method according to claim 1, wherein during a shift between transmission ratio ranges an assisting control impulse is superimposed on a transmission ratio adjustment regulating value.

21. A method according to claim 20, wherein the control impulse increases with increasing adjustment gradients.

22. A method according to claim 20, wherein the control impulse is a function of a value of an integrating element of the adjustment regulator before the shift.

23. A method according to claim 20, wherein the control impulse is superimposed on an integrating element of the adjustment regulator.

24. A method according to claim 1, wherein in the region of the shift between the transmission ratio ranges the target ratio of the variator is calculated directly from a target specification of the transmission ratio of the power-branched transmission and is supplied to the variator's adjustment regulator as a target specification.

25. A method according to claim 1, wherein gear changes with manual preselection of transmission ratios in different transmission ratio ranges take place in that the control clutches are already activated before reaching the shift point lying between the transmission ratio ranges.

26. A method according to claim 1, wherein in the event of gear changes with manual preselection of the transmission ratio, a respectively engaged control clutch is disengaged, the variator rapidly adjusts to a desired new transmission ratio, and subsequently the control clutch is engaged again.

27. A method according to claim 1, wherein in branched operation of the transmission its gradient of the input rotational speed is changed in such a way that the acceleration power for internal transmission forces of inertia changes little or the output power changes evenly.

* * * * *